（12）United States Patent
Toshimitsu et al.

(10) Patent No.: US 8,332,682 B2
(45) Date of Patent: Dec. 11, 2012

(54) INTERFACE CONTROL DEVICE

(75) Inventors: Kiyoshi Toshimitsu, Tokyo (JP);
Hiroshi Suu, Kanagawa-ken (JP);
Shinichi Matsukawa, Tokyo (JP);
Akihiro Kasahara, Chiba-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 480 days.

(21) Appl. No.: 12/712,571

(22) Filed: Feb. 25, 2010

(65) Prior Publication Data
US 2010/0218026 A1  Aug. 26, 2010

(30) Foreign Application Priority Data
Feb. 25, 2009  (JP) .................................. 2009-042805

(51) Int. Cl.
*G06F 1/04* (2006.01)
(52) U.S. Cl. ......................... 713/501; 713/500; 713/600
(58) Field of Classification Search ........................ None
See application file for complete search history.

(56) References Cited

U.S. PATENT DOCUMENTS

| 2005/0096086 A1* | 5/2005 | Singamsetty ................. 455/557 |
| 2005/0224589 A1* | 10/2005 | Park et al. ..................... 235/492 |
| 2005/0251609 A1* | 11/2005 | Chou et al. .................... 710/313 |
| 2006/0094461 A1* | 5/2006 | Hameed et al. ............ 455/552.1 |
| 2007/0005829 A1* | 1/2007 | Fujimoto ........................ 710/48 |

FOREIGN PATENT DOCUMENTS

| JP | 2006-216011 | 8/2006 |
| JP | 2008-147871 | 6/2008 |

* cited by examiner

*Primary Examiner* — Dennis M Butler
(74) *Attorney, Agent, or Firm* — Oblon, Spivak, McClelland, Maier & Neustadt, L.L.P.

(57) ABSTRACT

An interface control device includes a first interface, a second interface, a third interface, an interface controller and a clock supplying unit. The first interface is used to communicate with a first information processing device and obtain a first clock signal from the first information processing device. The second interface is used to communicate using a second clock signal with a second information processing device different from the first information processing device. The third interface is used to communicate with a controller of a data-storage medium. The interface controller performs an interface control for the first, second and third interfaces. Moreover, the clock supplying unit supplies the first clock signal to the third interface while communications through the second interface have not been established.

20 Claims, 16 Drawing Sheets

US 8,332,682 B2

INTERFACE CONTROL DEVICE

CROSS-REFERENCE TO RELATED APPLICATIONS

This application is based upon and claims the benefit of priority from the Japanese Patent Application No. 2009-042805, filed on Feb. 25, 2009, the entire contents of which are incorporated herein by reference.

BACKGROUND OF THE INVENTION

1. Field of the Invention

The present invention relates to an interface control device.

2. Description of the Related Art

A removable data-storage medium such as a memory card is conventionally connected to an information processing device that is used as a host device. The information processing device may be a digital camera, a cellular phone, a personal computer (PC), and a Personal Digital Assistant (PDA). Data is transmitted/received between the host device and the memory card through an interface such as a universal serial bus (USB).

JP-A 2006-216011 (KOKAI) discloses a technique to transmit the data stored in the memory card to an other device other than the host device (hereinafter, "external read device"). Specifically, the memory card has a communication controller to communicate using radio medium. The communication controller is configured to be controlled by the external read device. The external read device can receive the data stored in the memory card without operating the host device. In addition, this reference describes that the memory card independently handles accesses from the host device and from the external read device.

JP-A 2008-147871 (KOKAI) discloses a communication system in which the external read device (for example, radio-communication device) directly controls the memory card connected to the host device. A relaying device having a radio interface exists between the memory card and the host device. The external read device transmits a request information to the relaying device. The request information includes an instruction to control the memory card. The relaying device controls the memory card according to the instruction.

In the above references, when the external read device tries to access to the memory card, the external read device first transmits/receives a data to/from the memory card using a transmission rate. Next, the memory card writes/reads the data to/from a memory (for example, flash memory) in the memory card using an access rate.

The access rate depends on a frequency of a clock signal (hereinafter, "clock frequency") which is supplied by the host device. When the clock frequency is low, the access rate is also low regardless of the transmission rate. Since the low access rate becomes a bottleneck, the external read device can not access to the memory card using the high transmission rate. On the other hand, when the clock frequency is high, the access rate is also high regardless of the transmission rate. Especially, when the transmission rate is low, the high access rate may be wasted. In this case, a power consumption of the radio interface may become larger.

Moreover, the external read device may require address information of the memory card in order to access to the memory card. In JP-A 2006-216011 (KOKAI), the external read device may obtain the address information by adding a special function for getting the address information to an interface of the external read device. However, it is difficult for some information processing devices such as a PC using an existing interface to obtain the address information.

SUMMARY OF THE INVENTION

According to one aspect of the invention, an interface control device includes:
- a first interface to communicate with a first information processing device and obtain a first clock signal from the first information processing device;
- a second interface to communicate using a second clock signal with a second information processing device different from the first information processing device;
- a third interface to communicate with a controller of a data-storage medium;
- an interface controller to perform an interface control for the first, second and third interfaces; and
- a clock supplying unit to supply the first clock signal to the third interface while communications through the second interface have not been established.

According to other aspect of the invention, an interface control device includes:
- a first interface to communicate with a first information processing device and obtain a first clock signal;
- a second interface to communicate using a second clock signal with a second information processing device different from the first information processing device;
- a third interface to communicate with a controller of a data-storage medium;
- a converting unit to converts a frequency of the first clock signal to a frequency of the second clock signal;
- an interface controller to perform an interface control for the first, second and third interfaces; and
- a clock supplying unit to supply the first clock signal to the third interface while communications through the second interface have not been established
- and to generate a third clock signal based on the second clock signal and supply the third clock signal to the third interface while communications through the second interface have been established.

According to other aspect of the invention, an interface control device includes:
- a first interface to communicate with a first information processing device;
- a second interface to communicate with a second information processing device different from the first information processing device;
- a third interface to communicate with a controller of a data-storage medium;
- a management unit to manage a state of communications through the second interface; and
- an interface controller to perform an interface control including a determination whether signals are transmitted through either the second or third interface, or, neither the second nor third interface, according to a kind of the signals and the state of the communications, the signals being received through the first interface.

DETAILED DESCRIPTION OF THE INVENTION

The embodiments will be explained with reference to the accompanying drawings.

Description of the First Embodiment

Figure 1:
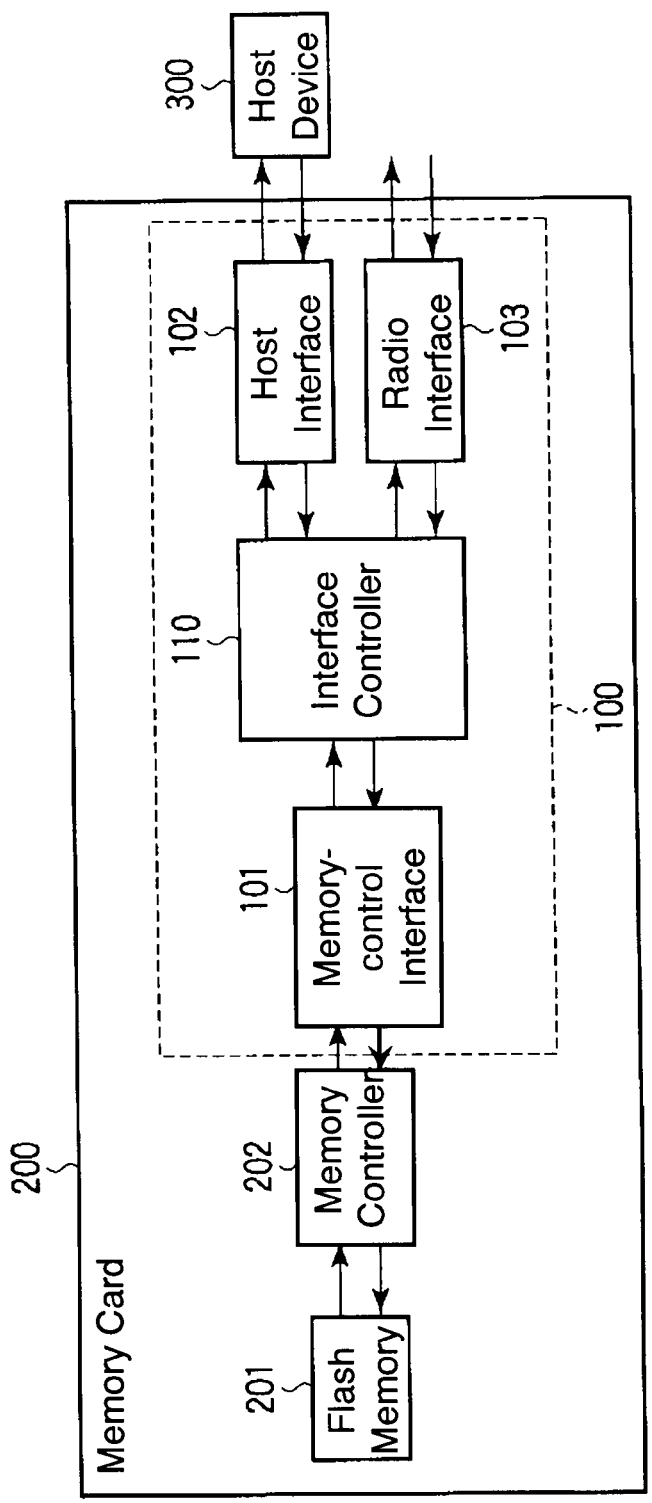
FIG. 1 is a block diagram illustrating an interface control device according to a first embodiment and related devices.

As shown in FIG. 1, an interface control device 100 according to a first embodiment of the invention includes a memory-control interface 101 (a third interface), a host interface 102 (a first interface), a radio interface 103 (a third interface), and an interface controller 110. The interface control device 100 may be provided as a dedicated circuit in a memory card 200, as an adapter connecting the memory card 200 to a host device 300, or as a dedicated circuit provided in the adapter. The host interface 102 is connected to a host controller (not shown) in the host device 300.

Figure 16:
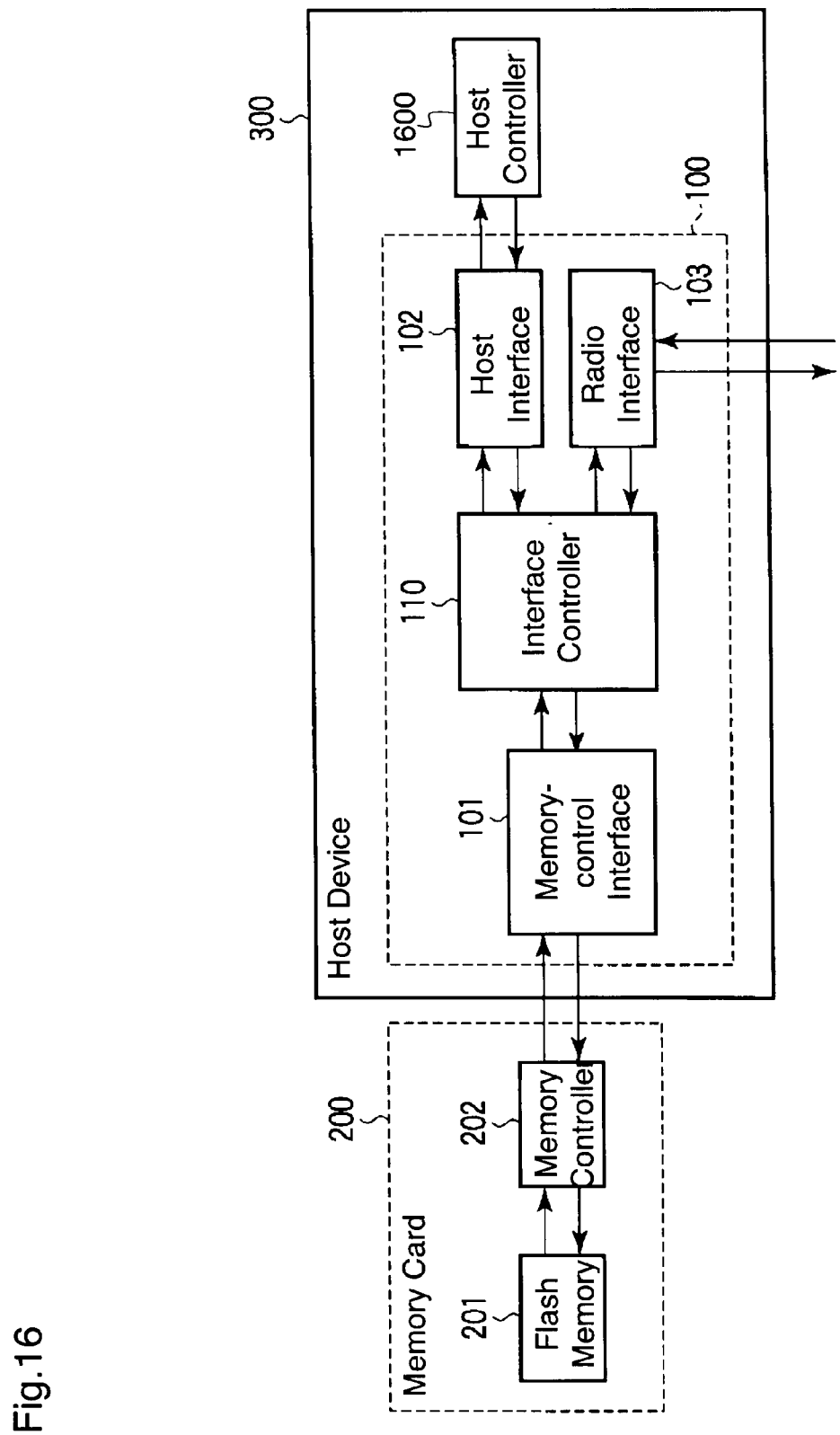
FIG. 16 is a block diagram illustrating another modified interface control device of FIG. 1 and FIG. 13.

As shown in FIG. 16, the interface control device 100 may be included in the host device 300 instead of the memory card 200. A host controller 1600 exists in the host device 300 in order to control the memory card 200.

FIG. 1 and FIG. 16 are essentially almost same except their implementations. Therefore, the host device 300 may not need change its architecture in order to realize FIG. 16 from FIG. 1. Only the interface control device 100 is inserted between the host controller 1600 and a card slot in which the memory card is inserted in order to realize FIG. 16. Hereinafter, we describe as the interface control device 100 exists in the memory card 200 as shown in FIG. 1.

The memory card 200 may be a memory card, which conforms to what is known as the SD standard (Secure Digital standard), such as an SD card, a mini SD card, and a micro SD card. Alternatively, the memory card 200 may be a memory card of other kinds including a multi-media card (MMC). The memory card 200 includes a flash memory 201 and a memory controller 202 (e.g., a NAND controller). The flash memory 201 is configured to store data. The memory controller 202 is configured to perform hardware control on the flash memory 201 so that data can be read from and written into the flash memory 201.

Figure 13:
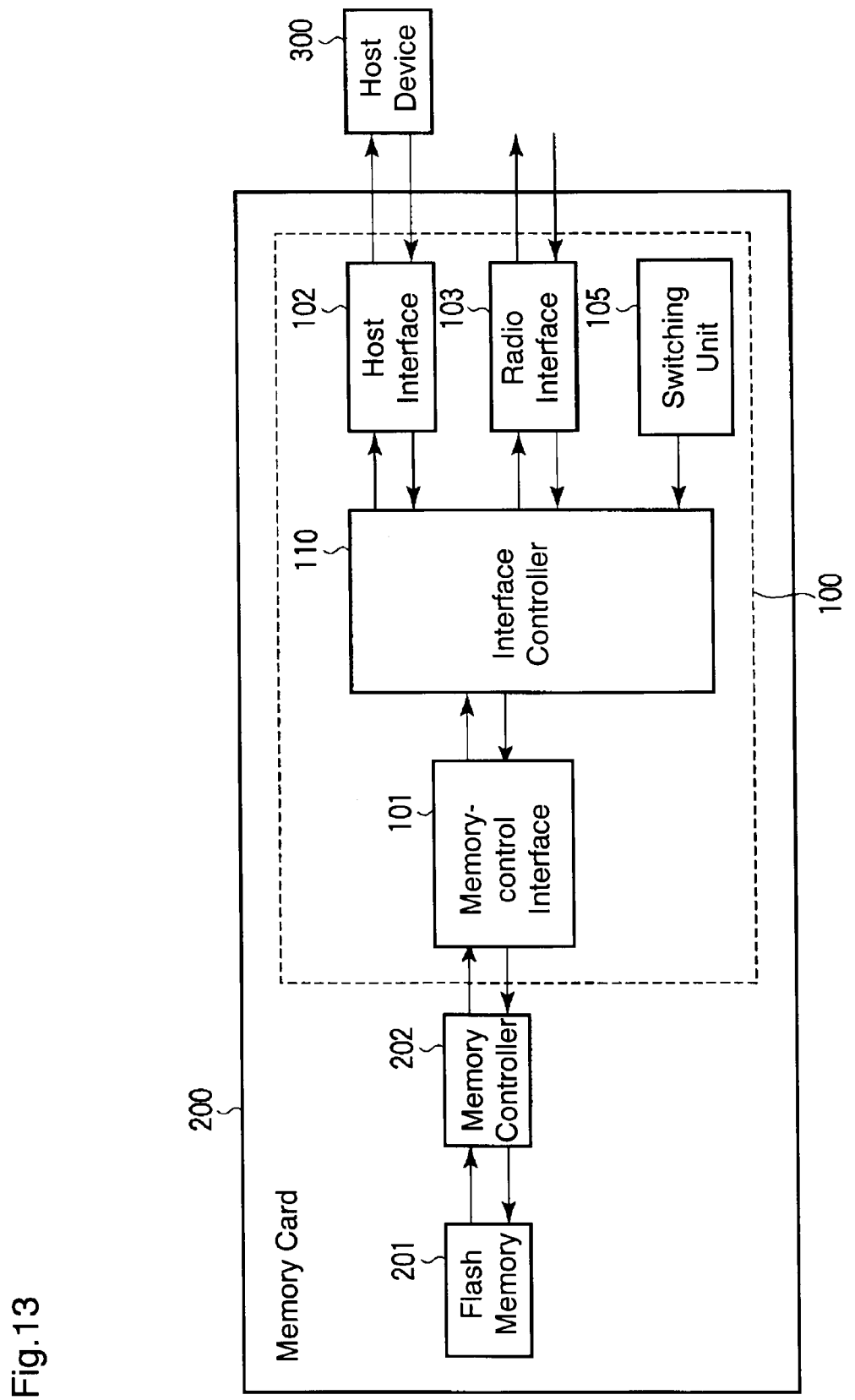
FIG. 13 is a block diagram illustrating a modified interface control device of FIG. 1.

As shown in FIG. 13, the interface control device 100 further includes a switching unit 105. The interface control device 100 has two operation modes that are a first operation mode and a second operation mode. In the first operation mode, the interface control device 100 transmits a common response when it receives a command which checks a memory capacity of the flash memory 201 from the host device 300. The common response shows that the memory capacity is not zero. This means that the host device 300 is able to access to the memory controller 202.

In the second operation mode, the interface control device 100 transmits a special response when it receives the command which checks a memory capacity of the flash memory 201 from the host device 300. The special response shows that the memory capacity is zero. This means that the host device 300 is not able to access to the memory controller 202. The switching unit 105 switches the operation modes of the interface control device 100. The switching unit 105 may switch the operation modes according to a switching indication from a dipswitch or received through software. An user can switch the operation modes by using the dipswitch such as a lock switch of the SD card.

The host device 300 operates as a slave device which is able to access to the memory controller 202 in the first operation mode only before the external device access to the memory controller 202. Also, the host device 300 operates as a master device which is not able to access to the memory controller 202 but is able to access to the external data-storage medium through the radio interface 103 in the second operation mode. Moreover, when the interface control device 100 is included in the host device 300 as shown in FIG. 16, the switching unit 105 is also included in the host device 300. In this case, the switching unit 105 may switch the operation modes according to the switching indication from the dipswitch or received through software.

The host device 300 is an information processing device, such as a digital camera, a cellular phone, and a PC. The host device 300 includes a card slot into which the memory card 200 is to be inserted.

The memory-control interface 101 is an interface to exchange data between the interface controller 110 and the memory controller 202. The host interface 102 is an interface to exchange data between the interface controller 110 and the host device 300. The host interface 102 includes plural signal lines. While a memory controller in an ordinary memory card includes a host interface to exchange data with the host device, the interface control device 100 is required to include the host interface 102 independently, since the interface control device 100 is positioned between the memory controller 202 and the host device 300. Signals transmitted from the host device 300 are analyzed by the interface control device 100, which will be described later. The signals thus analyzed are transmitted to the memory controller 202 through the memory-control interface 101, if necessary. If no modifications are made to the configuration of the memory controller 202, the signals transmitted by the host device 300 through the host interface 102 are basically the same signals as those transmitted through the memory-control interface 101 to the memory controller 202. In addition, the signals transmitted by the memory controller 202 to the memory-control interface 101 are also basically the same as those transmitted by the host interface 102 to the host device 300.

The radio interface 103 is an interface to exchange data between the interface controller 110 and a radio interface that is connected to an external device different from the host device 300. The radio interface 103 wirelessly communicates with the radio interface connected to the external device in compliance with Bluetooth®, WiFi®, or the like, for example. The radio interface 103 and the radio communications construct part of a wireless local area network (LAN) or a wireless personal area network (PAN). Note that even if the radio interface 103 is replaced with a wire-communication interface, the same effects that are obtainable by the interface control device 100 according to the first embodiment can be obtained. For example, the radio interface 103 may be replaced with a wire-communication interface to perform wire communications with another wire-communication interface that is connected to an external device. Such wire communications can be implemented by USBs. Moreover, the radio communication using a millimeter wave (30 GHz-300 GHz) may be better to reduce a size and increase a speed of the radio interface 103.

The interface controller 110 performs overall controls on the memory-control interface 101, the host interface 102, and the radio interface 103. For example, the interface controller 110 receives inputs of signals transmitted by the memory-control interface 101, the host interface 102, or the radio interface 103, and determines which one of the memory-control interface 101, the host interface 102, and the radio interface 103 should receive each of signals transmitted by the interface controller 110 in response to the received signals. The interface controller 110 relays the signals among the memory-control interface 101, the host interface 102, and the radio interface 103. The signals include commands for instructions of the kinds of hardware controls that the memory controller 202 should perform. The signals also include responses corresponding respectively to the commands.

For example, if the interface controller 110 receives a signal through the memory-control interface 101 and if the received signal is a response corresponding to a command received through the host interface 102, the interface controller 110 transmits the response to the host interface 102. In addition, if the interface controller 110 receives a signal through the memory-control interface 101, and if the received signal is a response corresponding to a command received through the radio interface 103, the interface controller 110 transmits the response to the radio interface 103. Moreover, if the interface controller 110 receives a response through the radio interface 103, the interface controller 110 transmits the response to the host interface 102. The interface controller 110 may convert formats of the signals into other formats to fit the interfaces to which the signals are outputted. Specifically, the interface controller 110 may packetize serial signals to obtain packetized signals and converts the packetized signals into the serial signals.

The interface controller 110 may control a clock frequency which is supplied to the memory-control interface 101. The interface controller 110 may convert a parameter such as a Relative Card Address (RCA) into other parameter before transmitting an input signal. Moreover, the interface controller 110 may automatically generate a response correspond to a received command and transmit it.

A clock signal is supplied to the interface control device 100 from the host device 300 through one of the signal lines included in the host interface 102. In each embodiment, a mechanism which supplies a pseudo-clock can be used. The pseudo-clock is not actual clock but it can be used as a clock, for example, a clock signal extracted from data signal such as USB. Specifically, in the case of USB, if data signals of either of "0" and "1" are continued, the clock signal can not be extracted. Therefore, when same data signals of "0" or "1" are continue more than a certain amount, the "0" or "1" is inverted and transmitted. Moreover, a power-supply voltage is supplied to the interface control device 100 through one of the signal lines included in the host interface 102. For example, the interface control device 100 uses one of the signal lines as the power-supply voltage (i.e., 3.3 V) and another of the signal lines as a ground. The power-supply voltage from the host device is also supplied to the memory controller 202 through the interface controller 110 and the memory-control interface 101. In addition, the host interface 102 is capable of being added to or removed from the configuration without shutting down the system (i.e., the host interface 102 supports hot swapping). Accordingly, even if the memory card 200 is inserted into the card slot after the booting of the host device 300, the host device 300 can recognize the memory card 200 without rebooting the host device 300.

In addition, the power-supply voltage is also supplied to the radio interface 103 through the interface controller 110. Triggered by the supply of the power-supply voltage, the radio interface 103 may execute searching processing to find an external device that is capable of performing radio communications. Note that the interface controller 110 may appropriately restrict the actions of the radio interface 103 for the purpose of avoiding wasteful power consumption. For example, the interface controller 110 may restrict the actions of the radio interface 103 if the interface controller 110 receives an input of a non-selection signal through the host interface 102, and if the received signal instructs that the memory card 200 should be excluded from the possible targets of data exchanges with the host device 300. Specifically, the interface controller 110 may disconnect the communications through the radio interface 103, or may switch the operational modes of the radio interface 103 to the low-power-consumption mode. If the memory card 200 is a SD card, the power-supply voltage from the host device 300 for initialization such as allocation of address is smaller than that for writing/reading. Therefore, the interface controller 110 may start supplying the power-supply voltage to the radio interface 103 after detecting complete of initialization by analyzing signals to the host device 300 from the memory controller 202. The interface controller 110 may also start supplying the power-supply voltage to the radio interface 103 after estimating complete of the initialization by measuring time which is taken to complete the initialization by a timer.

Figure 2:
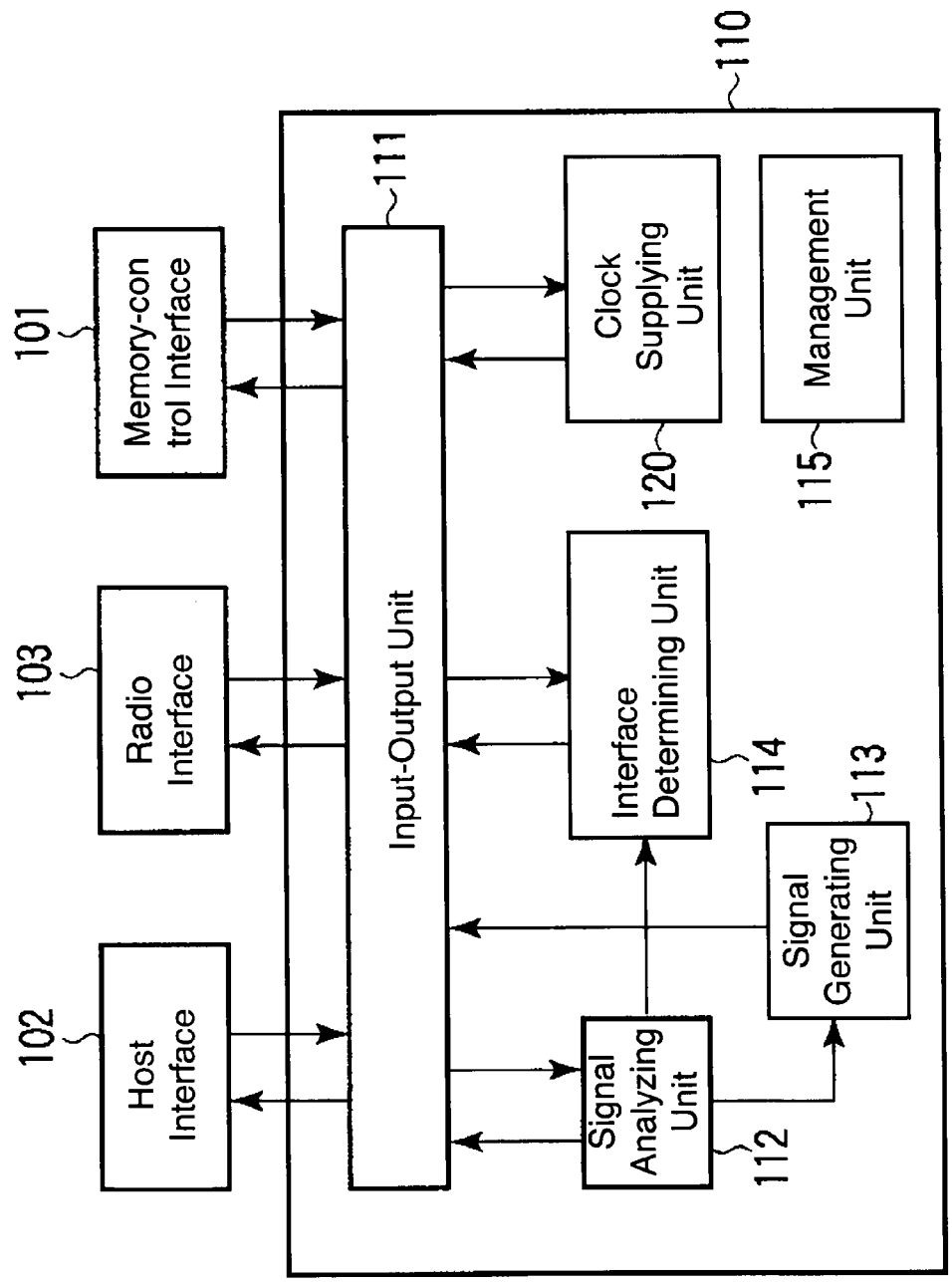
FIG. 2 is a block diagram illustrating the interface control device.

As FIG. 2 illustrates, the interface controller 110 includes an input-output unit 111, a signal analyzing unit 112, a signal generating unit 113, an interface determining unit 114, a management unit 115, and a clock supplying unit 120.

The input-output unit 111 receives inputs of signals transmitted by the memory-control interface 101, the host interface 102, or the radio interface 103. The input-output unit 111 transmits each of the signals received from the memory-control interface 101, the host interface 102, or the radio interface 103 to the signal analyzing unit 112. In addition, the input-output unit 111 outputs signals through one of the memory-control interface 101, the host interface 102, and the radio interface 103, while which interface should be used to this end is determined by the interface determining unit 116.

The signal analyzing unit 112 analyzes the signals received from the input-output unit 111. Specifically, the signal analyzing unit 112 analyzes from which one of the memory-control interface 101, the host interface 102, and the radio interface 103 each signal has been inputted. The signal analyzing unit 112 analyzes which signal is input through the host interface 102, an initialization signal, a transmission signal or a confirmation state signal. In the case that the memory card 200 of the SD card, the signal analyzing unit 112 determines a command transmitted in Card Identification Mode is the initialization signal. The signal analyzing unit 112 also determines a command which is transmitted in Data Transfer Mode to confirm the condition of the memory controller 202 is the confirmation state signal. Also, the signal analyzing unit 112 determines commands, which are transmitted in Data Transfer Mode to transmit data and is not the confirmation state signal, is the transmission signal. Moreover, the signal analyzing unit 112 obtains parameters such as address information (RCA) from the signals.

In addition, if the signal generating unit 113 is capable of spontaneously generating a response to a signal, the signal analyzing unit 112 transmits the signal to the signal generating unit 113. The signal generating unit 113 generates a signal (e.g., response) to be a reply to the signal (e.g., command) received from the signal analyzing unit 112, and inputs the signal thus generated into the input-output unit 111. Moreover, the signal generating unit 113 may generate signals of various kinds other than the response described above.

The interface determining unit 114 determines to output a signal, which is input through the host interface 102, through the memory-control interface 101 while the communication through the radio interface 103 is not established. Also, the interface determining unit 114 determines to output a signal, which is input through the memory-control interface 101, through the host interface 102 while the communication through the radio interface 103 is not established. While the communication through the radio interface 103 is not established, the signal analyzing unit 112 and the signal generating unit 113 may not operate, because the interface controller 110 relays signals only between the host interface 102 and the memory-control interface 101. Therefore, the management unit 115 may stop supplying the clock signal to the signal analyzing unit 112 and the signal generating unit 113 and perform low power consumption mode for the signal analyzing unit 112 and the signal generating unit 113.

The interface determining unit 114 determines to output a signal in response to a signal, which is input through the radio interface 103, through the memory-control interface 101 or the host interface 102 according to results of analyzing the signal by the signal analyzing unit 112. Specifically, the interface determining unit 114 determines to output a signal through the memory-control interface 101, if the signal input through the radio interface 103 is a command or an indication of "Write data". Also, the interface determining unit 114 determines to output a signal through the host interface 102, if the signal input through the radio interface 103 is a response or an indication of "Read data". The signal analyzing unit 112 is able to judge which indication is the signal, the "Read data" or the "Write data" based on the command which is analyzed last before input of the signal, if the signal input through the radio interface 103 is data.

The management unit 115 manages the input-output unit 111, the signal analyzing unit 112, the signal generating unit 113, the interface determining unit 114, and the clock supplying unit 120.

The clock supplying unit 120 is connected to the clock generator (not shown) such as crystal oscillator to obtain a clock signal. The clock generator outputs the clock signal to the radio interface 103. The clock supplying unit 120 converts the clock frequency of the clock signal into other clock frequency in order to supply to the memory-control interface 101, while the radio communication has been established through the radio interface 103. The clock supplying unit 120 supplies the clock signal from the host device 300 to the memory-control interface 101, while the radio communication has not been established through the radio interface 103. The clock generator may be included in the clock supplying unit 120 or in the radio interface 103. In above description, the clock supplying unit 120 exists in the interface controller 110. However, the clock supplying unit 120 and the interface control 110 can be provided by separate device (e.g., LSI). The clock supplying unit 120 may be included the radio interface 103. The radio interface 103 and the interface controller 110 are included in one device. The clock supplying unit 120 is included in the interface controller 110 in below description.

Recently, many kinds of the radio communication standards have been established. Each radio communication standard has a different maximum transmission rate from other radio communication standards and each of them requires a clock frequency due to each maximum transmission rate. For example, the maximum transmission rate is 11 [Mbps] in the IEEE 802.11b. The maximum transmission rate is 600 [Mbps] in the IEEE 802.11n. Moreover, a new wireless LAN standard of which the maximum transmission rate is over 1 [Gbps] is being standardized. Wireless HD® is also being standardized as one of the radio communication standards in order to transmit/receive a HD (High Definition) video with the maximum transmission rate is over 1 [Gbps] using a millimeter wave. In this embodiment, when the radio interface 103 supports several radio communication standards, the clock generator can generate the clock signal due to the radio communication standard.

Hereinafter, a system including the interface control device 100 according to the first embodiment will be described below by referring to FIG. 3. The system includes a host device 300-1, a memory card 200-1 that is connected to the host device 300-1, a host device 300-2, and a memory card 200-2 that is connected to the host device 300-2. The memory card 200-1 includes an interface control device 100-1 whereas the memory card 200-2 includes an interface control device 100-2. Note that in FIG. 3, each of the interface control device 100-1 and the interface control device 100-2 has a configuration that is identical to the configuration of the interface control device 100. Moreover, the memory cards 200-1, 200-2 are same configuration of the memory card 200.

Figure 3:
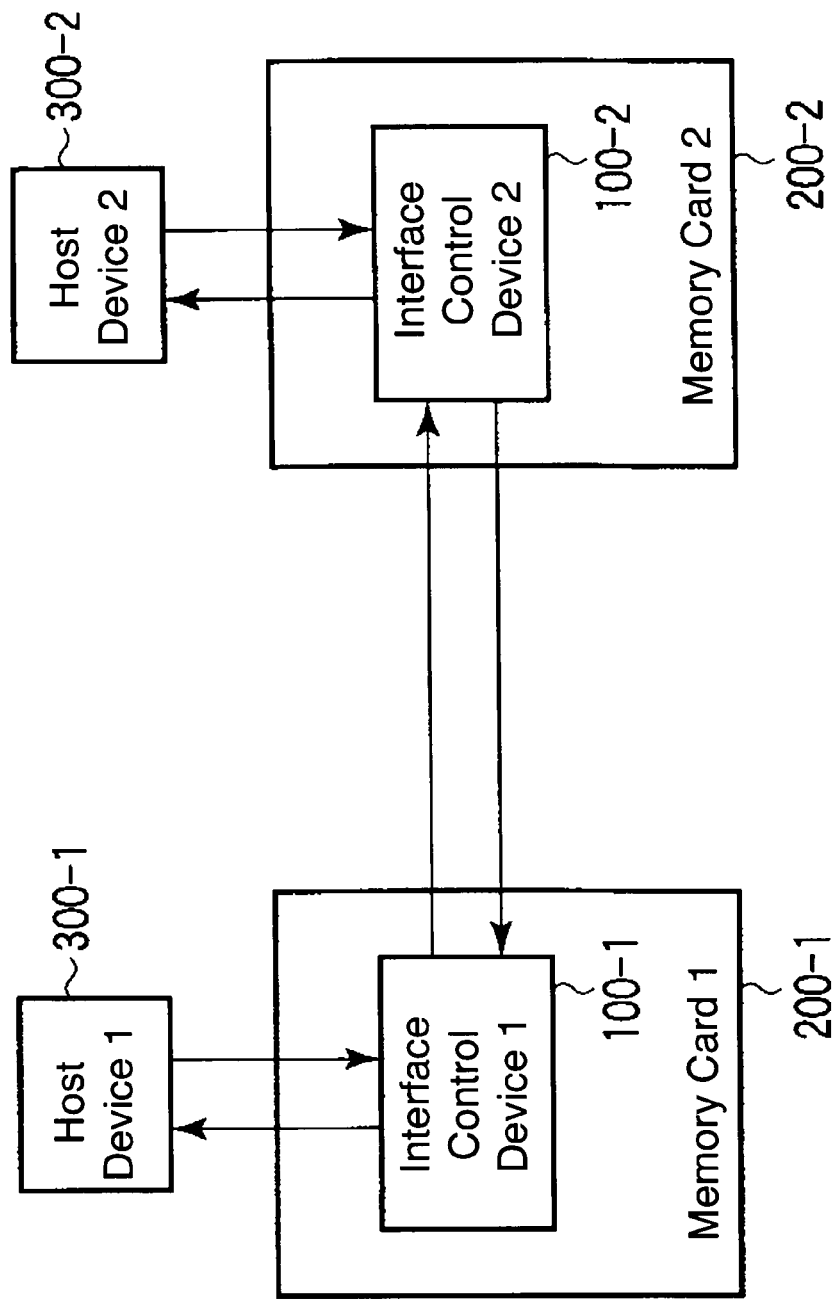
FIG. 3 is a block diagram illustrating a system including the interface control device shown in FIG. 1.

In the system illustrated in FIG. 3, the host device 300-1 exchanges data with a memory controller 202-1 provided in the memory card 200-1, through the interface control device 100-1. In addition, the host device 300-1 exchanges data with a memory controller 202-2 provided in the memory card 200-2, through the interface control device 100-1 and the interface control device 100-2. Meanwhile, the host device 300-2 exchanges data with the memory controller 202-2 through the interface control device 100-2. In addition, the host device 300-2 exchanges data with the memory controller 202-1 through the interface control device 100-2 and the interface control device 100-1.

In the system illustrated in FIG. 3, when the host device 300-2 accesses to the memory card 200-1, it is important to match the access speed of the memory card 200-1 to the transmission rate of the radio communication between the interface control device 100-1 and the interface control device 100-2. If the transmission rate is high, the access speed is better to be high. On the other hand, if the transmission rate is low, the access speed is better to be low in order to reduce the power consumption. The matching is realized by converting the clock frequency by the clock supplying unit 120-1 in the interface control device 100-1.

An example case, that the transmission rate between the interface control device 100-1 and the interface control device 100-2 is higher than the access speed of the memory card 200-1, is considered. The access speed depends on the clock frequency supplied by the host device 300-1. If the clock supplying unit 120-1 does not perform converting the clock frequencies, the transmission rate is not used fully because the access speed is limited due to the clock frequency supplied by the host device 300-1. Therefore, the access speed to the memory card 200-1 from the host device 300-2 is limited due to the clock frequency supplied by the host device 300-1.

Other example case, that the transmission rate between the interface control device 100-1 and the interface control device 100-2 is lower than the access speed of the memory card 200-1, is considered. If the clock supplying unit 120-1 does not perform converting the clock frequencies, amount of the data which is read from the memory card 200-1 per a time is over than the amount of data which is transmitted by the radio communication per a time. Therefore, a buffer is needed to store the data until it is transmitted. The buffer prevents the interface control device 100-1 from achieving low cost. The buffer can be omitted by a flow controlling. However, since the memory access is still performed with a high speed, it is difficult to reduce the power consumption.

The clock frequency supplied by the host device 300-1 may not be enough to realize the maximum transmission rate of the memory card 200-1. For example, even if the latest memory card 200-1 is connected to an older host device 300-1, the latest memory card 200-1 may not be able to operate with high speed.

The interface control device 100 include the clock supplying unit 120 in order to switch the clock frequency supplying to the memory-control interface 101. The clock supplying unit 120 supplies the clock signal supplied by the host device 300 to the memory-control interface 101 while the communication through the radio interface 103 has not been established. On the other hand, the clock supplying unit 120 supplies the clock signal which is not supplied by the host device 300 but by the radio interface 103 to the memory-control interface 101 while the communication through the radio interface 103 has been established. Therefore, access from the host device 300-2 to the memory card 200-1 can achieve high efficiency by the clock supplying unit 120-1 regardless of ability of the host device 300-1. The interface determining unit 114 may determine which clock is supplied to the memory-control interface 101, the clock supplied by the host device 300 or supplied by the clock supplying unit 120. This can be realized by implementing some of functions of the clock supplying unit 120.

In general, if plural accesses to a shared hardware resource conflict one another, an exclusive control has to be performed. For example, in the system illustrated in FIG. 3, the access of the host device 300-1 to the memory controller 202-2 conflicts with the access of the host device 300-2 to the memory controller 202-1. Specifically, for example, before the memory controller 202-2 that has received a Read command from the host device 300-2 transmits a response back to the host device 300-2, the host device 300-1 might transmit a Write command for the data targeted by the Read command, to the memory controller 202-2. So, it is desirable for the interface control device 100 also to perform some kinds of exclusive controls. Subsequently, an example of possible exclusive controls in the system illustrated in FIG. 3 will be described.

The interface control device 100-2 relays signals between the host device 300-2 and the memory controller 202-2, while the communication has not been established between the interface control device 100-2 and the interface control device 100-1. On the other hand, the interface control device 100-2 relays signals between the host device 300-1 (exactly, the interface control device 100-1) and the memory controller 202-2, while the communication has been established between the interface control device 100-2 and the interface control device 100-1. Accordingly, the interface control device 100-2 denies the access of the host device 300-2 to the memory controller 202-2, while the communication has been established between the interface control device 100-2 and the interface control device 100-1. For example, upon receiving a command from the host device 300-2, the interface controller 100-2 transmits a response representing BUSY of the memory controller 202-2 (a response meaning that the memory controller 202-2 is currently being used) back to the host device 300-2.

The switching by the switching unit 105 may also be used an exclusive access control. For example, a user wants to realize the exclusive access between the host device 300-1 and the memory card 200-2, the user may set the switching unit 105-1 of the interface control device 100-1 to the second operation mode and set the switching unit 105-2 of the interface control device 100-2 to the first operation mode. If the switching units 105-1, 105-2 are set as described above, the interface control device 100-1 does not relay the signals between the host device 300-1 and the memory card 200-1, but relays the signals between the host device 300-1 and the interface control device 100-2 while the communication has been established. The interface control device 100-2 relays the signals between the host device 300-2 and the memory controller 202-2 while the communication has not been established. On the other hand, the interface control device 100-2 relays between the interface control device 100-1 and the memory controller 202-2, and denies the access from the host device 300-2 to the memory controller 202-2 while the communication has been established.

According to the first embodiment, the interface control device switches the clock frequency supplying the memory-control interface according to the information processing device (e.g., a host device or a external device) which accesses to the data-storage medium. Therefore, the interface control device can achieve higher efficiency in access from the external device to the data-storage medium regardless of the ability of the host device.

Description of the Second Embodiment

Figure 4:
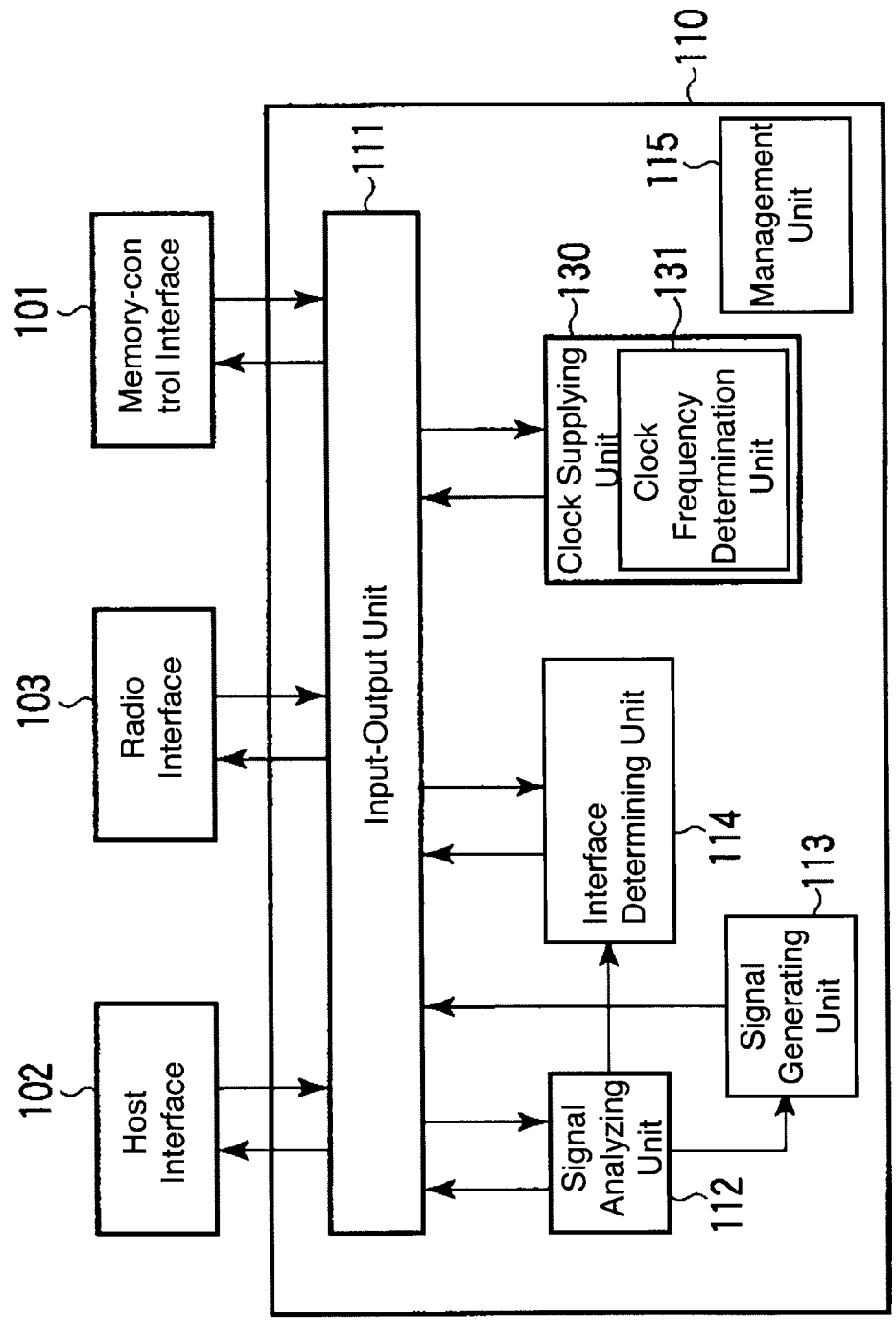
FIG. 4 is a block diagram illustrating an interface control device according to a second embodiment.

As shown in FIG. 4, an interface control device 100 in the second embodiment is almost same as the interface control device 100 of the first embodiment shown in FIG. 2 except for replacing the clock supplying unit 120 with the clock supplying unit 130. We will mainly explain different points between the first and second embodiments.

The clock supplying unit 130 includes a clock frequency determination unit 131. The clock frequency determination unit 131 determines the clock frequency and supplies the clock frequency to the memory-control interface 101 while the communication has been established through the radio interface 103.

The clock frequency determination unit 131 determines the clock frequency of the access speed of the memory card 200 in order to suit to the transmission rate of the radio communication through the radio interface 103. The transmission rate of the radio communication through the radio interface 103 may vary depending on the ability of other device and environment for communication. The access speed of the memory card 200 can become higher by adjusting the access speed according to the transmission rate through the radio interface 103 in the clock frequency determination unit 131. As a result, the access speed from the external device to the memory card 200 becomes higher.

The ability of the other device may also depend on the access speed between the memory card (e.g., memory card 200-2 in FIG. 3) and the host device 300-2. If at least one of the access rate of between the interface control device 100-1 and the memory controller 202-1 in the memory card 200-1, transmission rate of the radio communication between the interface control device 100-1 and the interface control device 100-2, and transfer rate of between the interface control device 100-2 and the host device 300-2 is low, it can be a bottleneck to access to the memory card 200-1 from the host device 300-2. In the second embodiment, the interface control device 100-2 is the master device and the interface control device 100-1 is the slave device. Then, the interface control device 100-2 indicates the transfer rate of between the interface control device 100-2 and the host device 300-2 to the interface control device 100-1 after the radio communication has established. On the other hand, the interface control device 100-1 indicates the maximum access rate of between the interface control device 100-1 and the memory controller 202-1 to the interface control device 100-2. The transfer rate and the access rate may be the clock frequency. The interface control device 100-1 may determine the clock frequency supplied to the memory controller 202-1 according to the transfer rate of between the interface control device 100-2 and the host device 300-2. Moreover, in the case that the flash memory 201 is used as a temporal buffer (as described in the eleventh and thirteenth embodiments), the interface control devices 100-1, 100-2 may indicate the transfer rate of between itself and the host devices 300-1, 300-2, and the maximum access rate of between itself and the memory controllers 200-1, 200-2, each other.

In the second embodiment, the transmission rate is calculated due to a modulation method and coding rate for the radio communication. The transmission rate may be a throughput which is calculated by dividing amount of a transmitted data by a time taken to transmit the data. The currency ability of other device can be estimated by the throughput. Therefore, the clock frequency may be determined according to the throughput to control the clock frequency with more high precision.

According to the second embodiment, the interface control device determines the clock frequency as the access rate of the memory card suits to the transmission rate through the radio interface. Therefore, the interface control device can achieve higher efficiency to access the data-storage medium from the external device.

Description of the Third Embodiment

Figure 5:
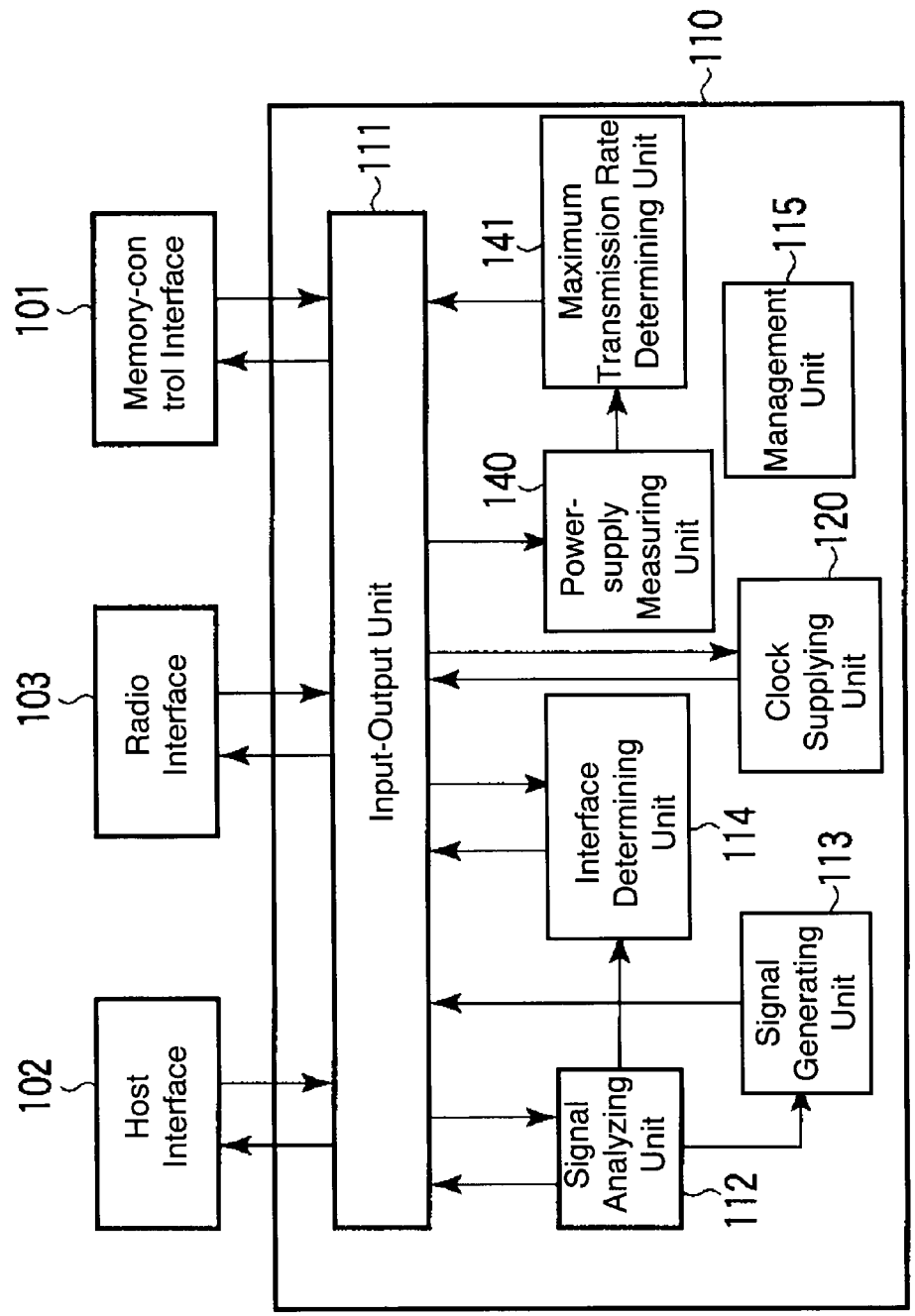
FIG. 5 is a block diagram illustrating an interface control device according to a third embodiment.

As shown in FIG. 5, an interface control device 100 in the third embodiment is almost same as the interface control device 100 of the first embodiment shown in FIG. 2 except for further including a power-supply measuring unit 140 and a maximum transmission rate determining unit 141. We will mainly explain different points between the first and third embodiments.

The power-supply measuring unit 140 measures amount of the power supplied by the device 300 through the host interface 102. Next, we will explain the power-supply from the host device 300.

The amount of the power supplied by the host device 300 to the interface control device 100 depends on an ability of the host device 300 (actually, the host controller in the host device) to which the memory card 200 is connected. Generally, the amount of the power supplied by the host device 300 is determined according to power consumption of the memory card which is connected to the host device 300. For example, when the memory card based on the current SD standard operates in a common transmission mode, it consumes electricity of the maximum 100 [mA]. When the memory card operates in a high transmission mode, it consumes electricity of the maximum 200 [mA]. Moreover, a SD card of next generation which is being standardized may consume more electricity. Therefore, the amount of the power supplied by the host device 300 may not be enough to work the memory card with a maximum performance.

Since the amount of the power supplied by the host device 300 depends on the ability of the host device 300, the amount of the power which can be used by the radio interface 103 also depends on the ability of the host device 300. Generally, more amount of the power is required in order to increase the transmission rate. Unless the transmission rate is not controlled, the power consumption of the radio interface 103 may be over the amount of the power supplied by the host device 300. As a result, the interface control device 100 may become unstable or may not work.

The maximum transmission rate determining unit 141 determines the maximum transmission rate of the radio interface 103 according to the amount of the power measured by the power-supply measuring unit 140. The maximum transmission rate is achieved when the radio interface 103 performs the radio communication due to a usable power keeping a stable operation of the interface control device 100. Therefore, if the amount of the power supplied by the host device 300 is large, the transmission rate may not be limited. However, if the amount of the power supplied by the host device 300 is not adequately large, the transmission rate may be limited in order to keep the stable operation of the interface control device 100. The interface controller 110 can control the clock frequency supplied to the memory-control interface according to the transmission rate, even if the transmission rate is controlled according to the amount of the power supplied.

According to the third embodiment, the interface control device determines the maximum transmission rate of the radio interface according to the amount of the power supplied by the host device 300. Therefore, the interface control device can keep performing the stable operation regardless of the ability of the host device and can optimize the transmission rate of the radio interface. As a result, the interface control device can achieve higher efficiency to access the data-storage medium from the external device.

Description of the Fourth Embodiment

Figure 6:
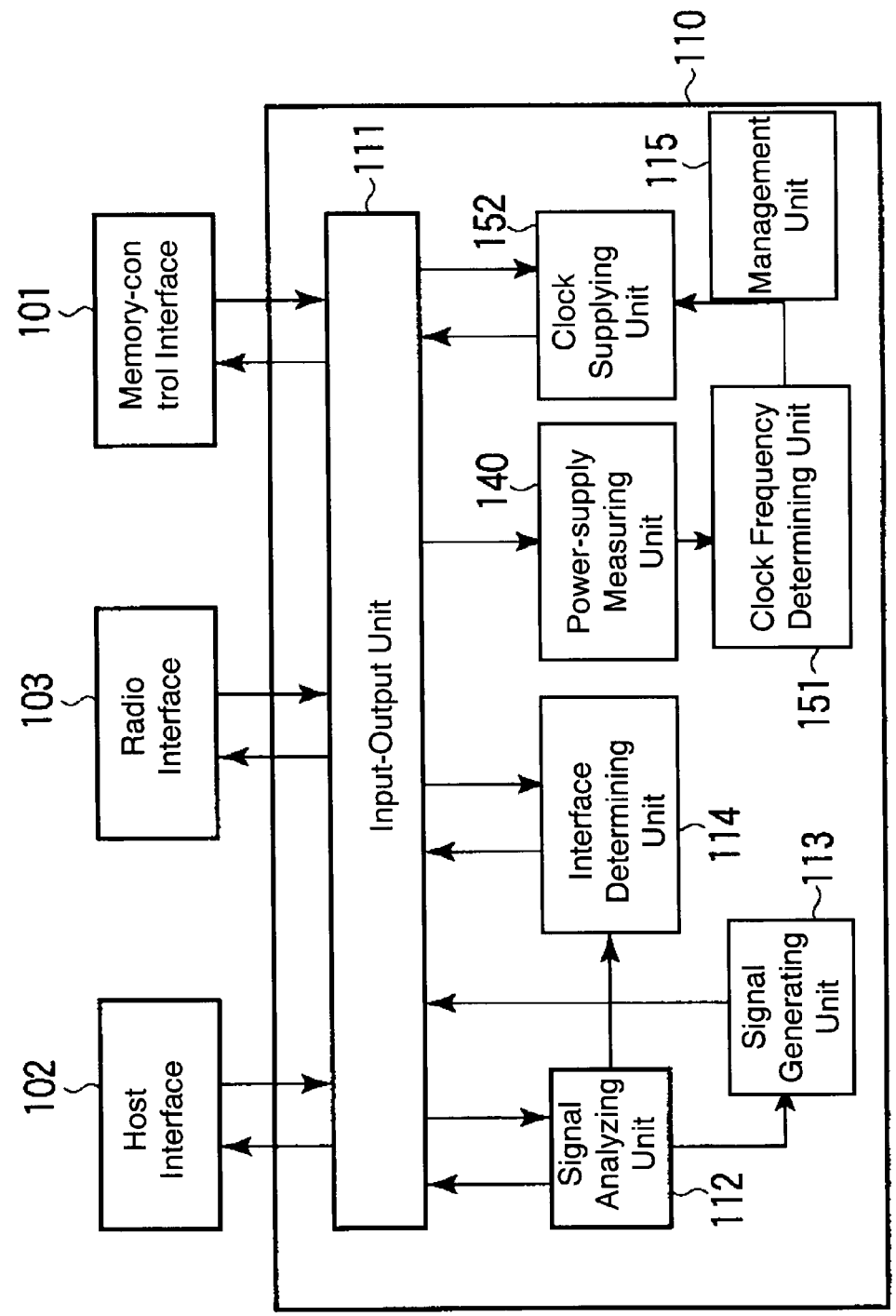
FIG. 6 is a block diagram illustrating an interface control device according to a fourth embodiment.

As shown in FIG. 6, an interface control device 100 in the fourth embodiment is almost same as the interface control device 100 of the third embodiment shown in FIG. 5 except for replacing the maximum transmission rate determining unit 141 with a clock frequency determining unit 151 and replacing the clock supplying unit 120 with a clock supplying unit 152. We will mainly explain different points between the third and fourth embodiments.

The clock frequency determining unit 151 determines the clock frequency supplied to the radio interface 103 by the clock supplying unit 152 according to the amount of the power measured by the power-supply measuring unit 140. The clock frequency determining unit 151 indicates the clock frequency to the clock supplying unit 152. The clock supplying unit 152 supplies a clock signal to the radio interface 103 according to the clock frequency. When the clock frequency determining unit 151 achieves the stable operation of the interface control device 100, it determines the clock frequency not to be over the maximum clock frequency which is allowed for a radio communication according to a usable power of the radio interface 103 and indicates it to the clock supplying unit 152. If the amount of the power supplied by the host device 300 is adequately large, the clock frequency of the radio interface 103 may not be limited. However, if the amount of the power supplied by the host device 300 is not adequately large, the clock frequency of the radio interface 103 may be limited in order to keep the stable operation of the interface control device 100. The interface controller 110 can control the clock frequency supplied to the memory-control interface 101 according to the transmission rate, even if the transmission rate varies as a result of controlling the clock frequency to be supplied to the radio interface 103 according to the amount of the power supplied.

According to the fourth embodiment, the interface control device 100 determines the maximum clock frequency of the radio interface 103 according to the amount of the power supplied by the host device. Therefore, the interface control device 100 can keep performing the stable operation regardless of the ability of the host device and can optimize the transmission rate of the radio interface. As a result, the interface control device can achieve higher efficiency to access the data-storage medium from the external device.

Description of the Fifth Embodiment

Figure 7:
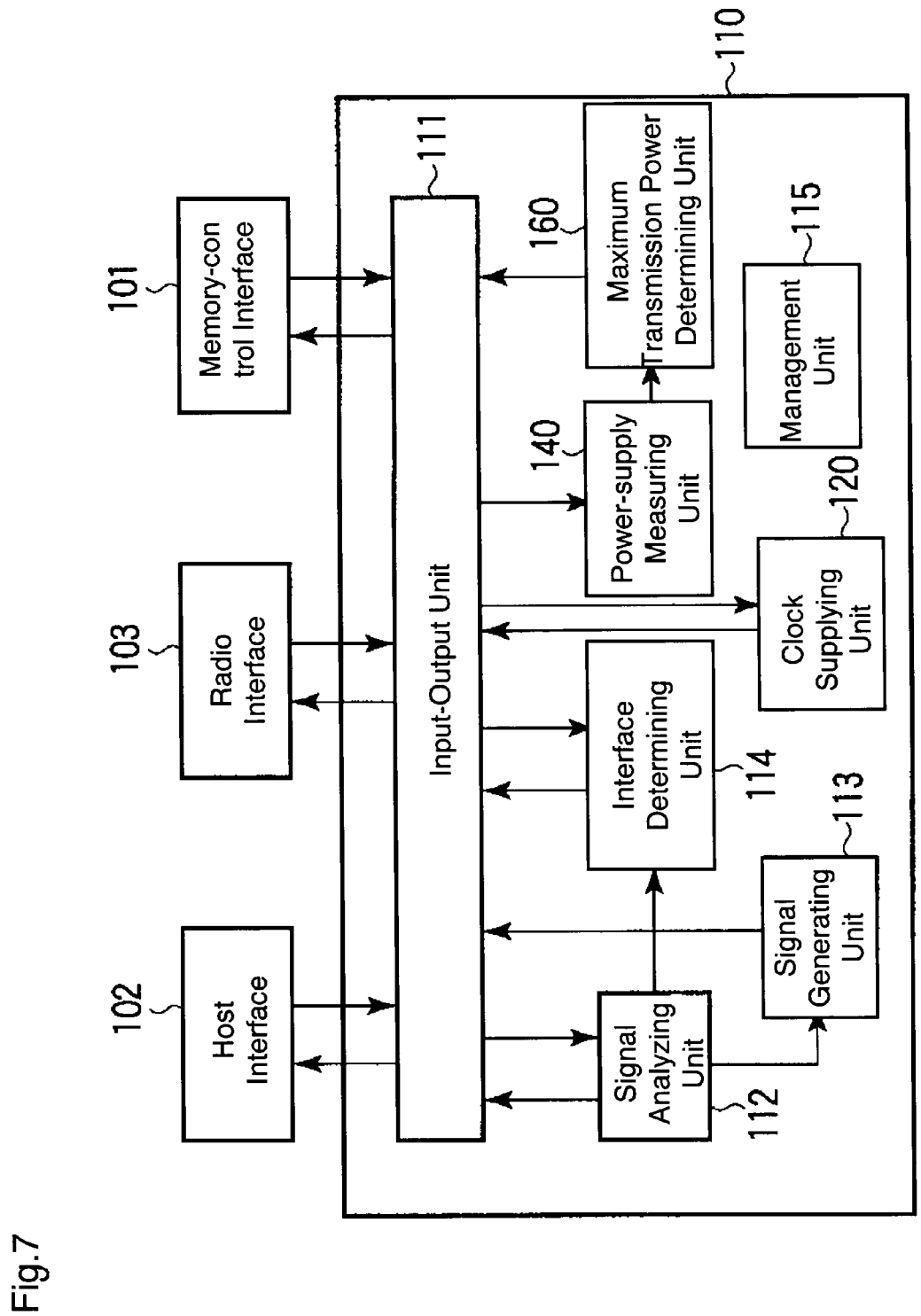
FIG. 7 is a block diagram illustrating an interface control device according to a fifth embodiment.

As shown in FIG. 7, an interface control device 100 in the fifth embodiment is almost same as the interface control device 100 of the third embodiment shown in FIG. 5 except for replacing the maximum transmission rate determining unit 141 with a maximum transmission power determining unit 160. We will mainly explain different points between the third and fifth embodiments.

The maximum transmission power determining unit 160 determines the maximum transmission power of the radio interface 103 according to the amount of the power measured by the power-supply measuring unit 140. The maximum transmission power is achieved when the radio interface 103 performs the radio communication due to a usable power keeping a stable operation of the interface control device 100. Therefore, if the amount of the power supplied by the host device 300 is large, the transmission power may not be limited. However, if the amount of the power supplied by the host device 300 is not adequately large, the transmission power may be limited in order to keep the stable operation of the interface control device 100. The interface controller 110 can control the clock frequency supplied to the memory-control interface 101 according to the transmission rate, even if the transmission rate varies as a result of controlling the maximum transmission rate according to the amount of the power supplied.

According to the fifth embodiment, the interface control device 100 determines the maximum transmission power of the radio interface 103 according to the amount of the power supplied by the host device. Therefore, the interface control device 100 can keep performing the stable operation regardless of the ability of the host device and can optimize the transmission power of the radio interface. As a result, the interface control device can achieve higher efficiency to access the data-storage medium from the external device.

Description of the Sixth Embodiment

The interface control devices 100 according to the first to fifth embodiments include a clock generator such as a crystal oscillator in order to generate a clock supplied to the radio interface 103. However, the clock generator may prevent the interface control devices 100 from reducing a size and cost, when the interface control device 100 is included in the memory card 200 as a dedicated circuit. An interface control devices 100 according to the sixth embodiment can operate without the clock generator.

Figure 8:
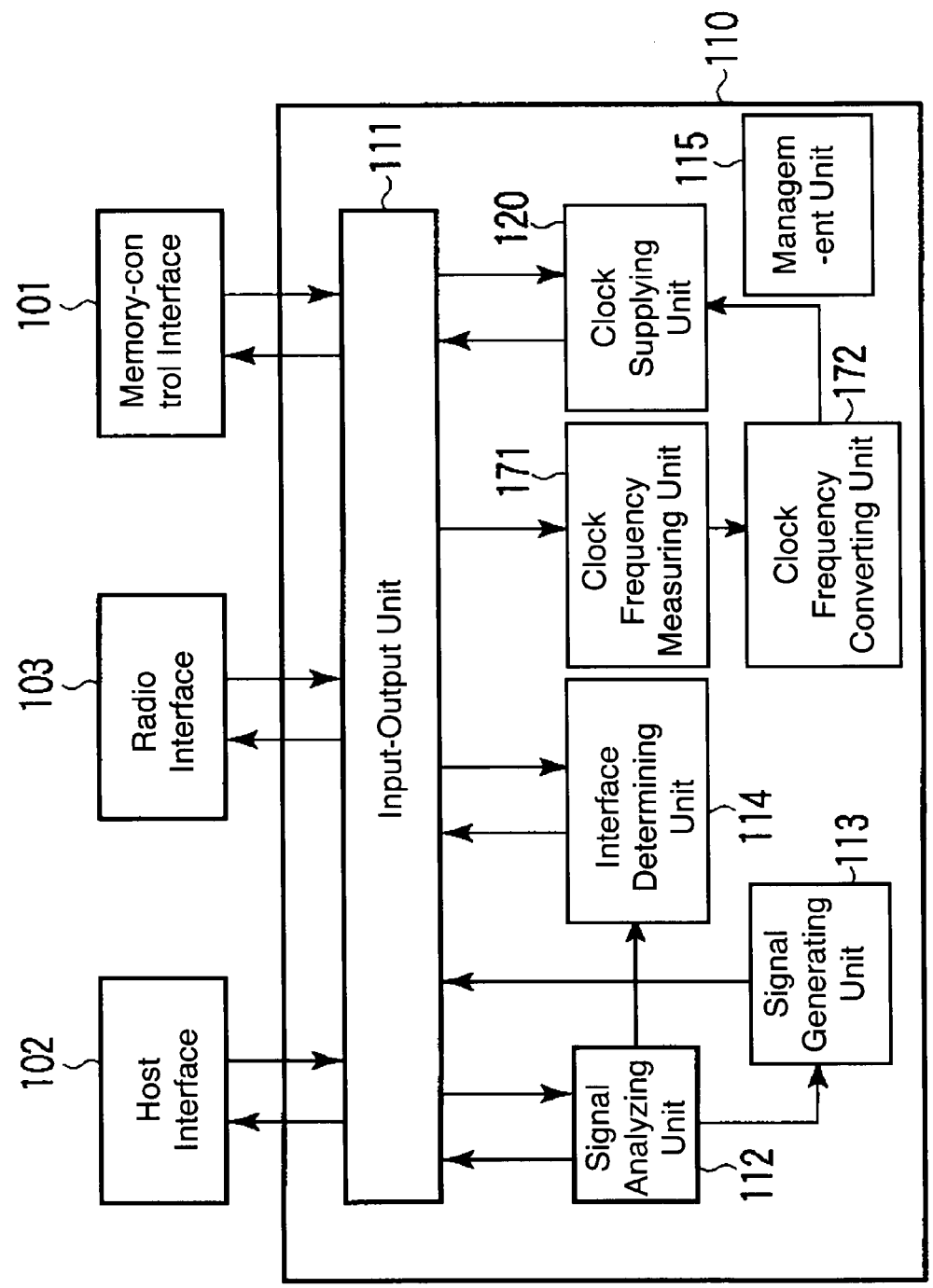
FIG. 8 is a block diagram illustrating an interface control device according to a sixth embodiment.

As shown in FIG. 8, the interface control device 100 according to the sixth embodiment includes a memory-control interface 101, a host interface 102, a radio interface 103, and an interface controller 110. The interface controller 110 includes an input-output unit 111, a signal analyzing unit 112, a signal generating unit 113, an interface determining unit 114, a management unit 115, a clock supplying unit 120, a clock frequency measuring unit 171, and a clock frequency converting unit 172 (a converting unit). We will mainly explain different points between the first and sixth embodiments.

The clock frequency measuring unit 171 measures the clock frequency which is supplied by the host device 300 through the host interface 102. Generally, the clock frequency depends on the host device 300. The clock frequency measuring unit 171 may measure the clock frequency by measuring a cycle of a clock signal supplied by the host device 300. Or, the clock frequency measuring unit 171 may measure the clock frequency by being indicated the clock frequency from the host device 300 using a communication protocol through the host interface 102. The clock frequency measuring unit 171 outputs the clock frequency measured (hereinafter, "first clock frequency") to the clock frequency converting unit 172.

The clock frequency converting unit 172 calculates a ratio of the first clock frequency to a second clock frequency. The second clock frequency is a clock frequency to be supplied to the radio interface 103. The clock frequency converting unit 172 converts the first clock frequency to the second clock frequency according to the ratio. Then, the clock frequency converting unit 172 outputs the second clock frequency to the clock supplying unit 120.

The clock supplying unit 120 supplies the second clock frequency to the radio interface 103. Moreover, the clock supplying unit 120 converts the second clock frequency into a third clock frequency and supplies it to the memory-control interface 101, while the communication through the radio interface 103 has been established. On the other hand, the clock supplying unit 120 supplies the first frequency from the host device 300 to the memory-control interface 101, while the communication through the radio interface 103 has not been established.

According to the third embodiment, the interface control device generates a clock signal by converting the clock signal supplied by the host device. Therefore, the interface control device of the sixth embodiment can remove a clock generator of the first to fifth embodiments. As a result, the interface control device of the sixth embodiment can reduce the size and the cost.

Description of the Seventh Embodiment

Figure 9:
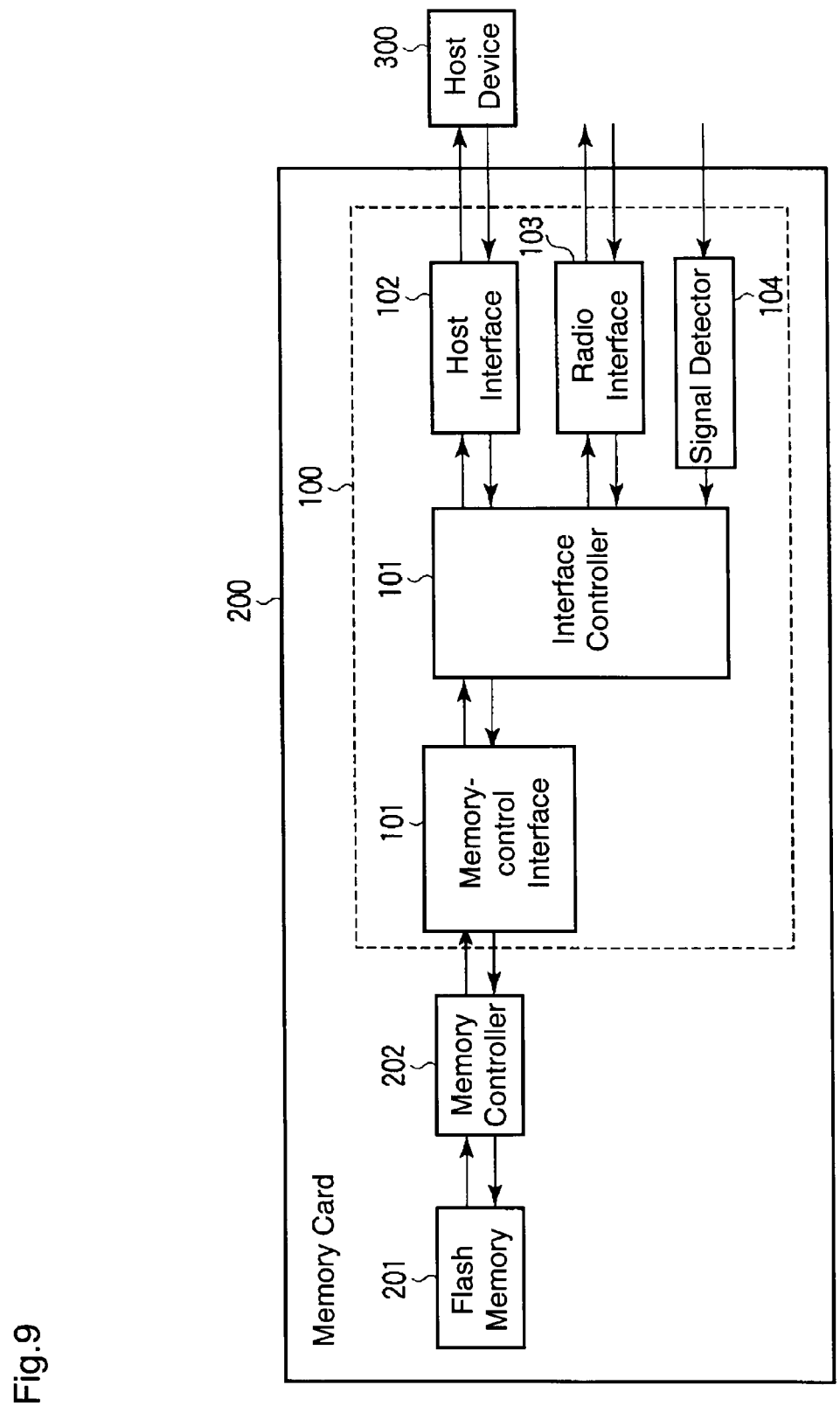
FIG. 9 is a block diagram illustrating an interface control device according to a seventh embodiment.

As shown in FIG. 9, an interface control device 100 in the seventh embodiment is almost same as the interface control device 100 of the first embodiment shown in FIG. 1 except for further including a signal detector 104. We will mainly explain different points between the first and seventh embodiments.

In the first to sixth embodiments, when the interface controller 110 is in the first operation mode, the interface controller 110 relays signals between the host device 300 and the memory controller 202 and relays signals between the external device and the memory controller 202 through the radio interface 103. On the other hand, when the interface controller 110 is in the second operation mode, the interface controller 110 relays signals between the external device and the memory controller 202 through the radio interface 103. Therefore, when the interface controller 110 of each of the first to sixth embodiments is in the first operation mode, the interface controller 110 always supplies power to the radio interface 103 even though the radio interface 103 is used at random times.

When the interface controller 110 of the interface control device 100 in the seventh embodiment is in the first operation mode, the interface controller 110 stops supplying the power to the radio interface 103. Specifically, the interface controller 110 inactivates the radio interface 103. The interface controller 110 relays signals between the host interface 102 and the memory-control interface 101. On the other hand, when the interface controller 110 of interface control device 100 in the seventh embodiment is in the second operation mode, the interface controller 110 keeps supplying the power to the radio interface 103 in order to perform radio communication at any time.

The signal detector 104 in FIG. 9 detects signals of the radio communication, which are able to be received by the radio interface 103. While the radio interface 103 is inactive, if the signal detector 104 detects the signal of the radio communication, the interface controller 110 starts supplying the power to the radio interface 103. When the interface controller 110 of interface control device 100 is in the first operation mode, the radio interface 103 is active by being supplied the power by the interface controller 110. Since the radio interface 103 keeps being inactive until receiving the signal from the external device, it does not consume the power.

According to the seventh embodiment, the interface control device inactivates the radio interface, when accesses to the external device and the data-storage medium of the host device may compete each other. Then, the radio interface becomes active by detecting a signal transmitted from the external device. Since the power is not supplied to the radio interface until the radio communication starts, the interface control device can reduce the power consumption. The interface control device can adjust the power to be supplied to the interface control device in order to access to the data-storage medium from the external device. This may be useful when the external device is the information processing device which has enough power such as the external device, and the host device is the information processing device has a tight power such as the digital camera and mobile phone.

Description of the Eighth Embodiment

Figure 10:
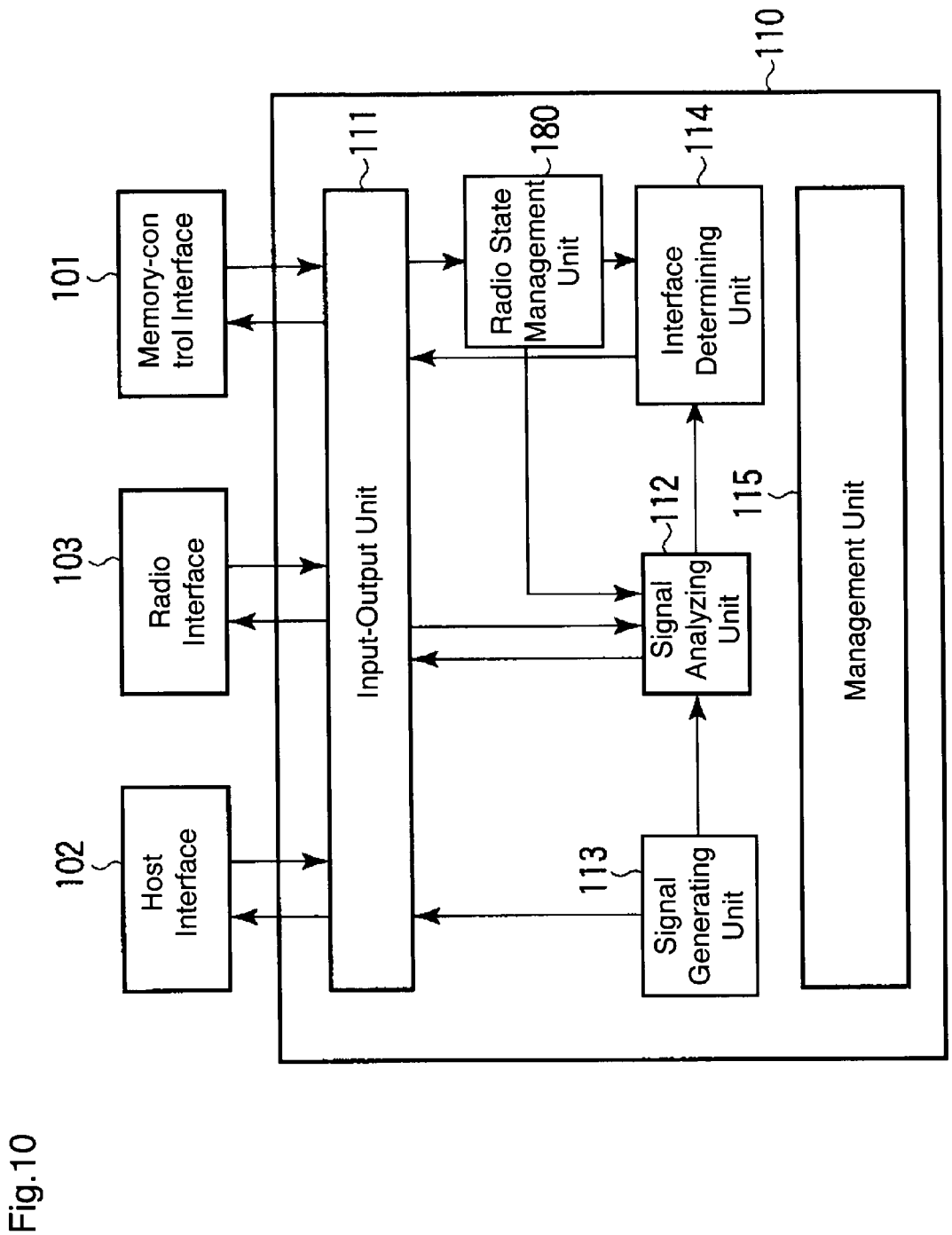
FIG. 10 is a block diagram illustrating an interface control device according to an eighth embodiment.

As shown in FIG. 10, an interface controller 110 of an interface control device 100 is almost same as the interface controller 110 of the first embodiment shown in FIG. 2 except for further including a radio state management unit 180. We will mainly explain different points between the first and eighth embodiments.

The radio state management unit 180 detects transits of condition of the communication through the radio interface 103 from an unconnected state to an established state, and from the established state to the unconnected state. The radio state management unit 180 may further measures a quality of the communication and judge if the quality measured is meet to a desired quality or not. The quality of the communication may be a transmission rate of the communication through the radio interface 103. The radio state management unit 180 may calculate the transmission rate due to the number of the transmitted/received bits through the radio interface 103. Or, the radio state management unit 180 may estimate the transmission rate due to received power. When the quality does not meet the desired quality, the interface controller 110 may control the radio interface 103 as same as the communication is in the unconnected state even if the communication is actually in the established state. The radio state management unit 180 indicates the condition of the communication through the radio interface 103 to the signal analyzing unit 112.

Hereinafter, we will explain initialization of the memory cards 200-1, 200-2 shown in FIG. 3. In the seventh embodiment, the memory cards 200-1, 200-2 may be SD cards.

In general, a memory controller in the SD card performs the initialization of the SD card and read/write according to commands from the host device. The SD card generates a response correspond to the command and transmits it to the host device. For example, in Card Identification Mode, the SD card performs allocation of RCA and the host device selects the SD card and obtains the memory information. Specifically, the host device transmits command 3, which requires transmission of RCA to the SD card, using a bus connected to the SD card. The bus of the SD card has a star topology. The SD card receives the command 3, and then the SD card transmits a response 6 frame including RCA to the host device. After transmitting the response 6 frame, the operation mode of the SD card transits to Data Transfer Mode. In Data Transfer Mode, the SD card transmits a command transmitted by the host device to the several buses.

Figure 11:
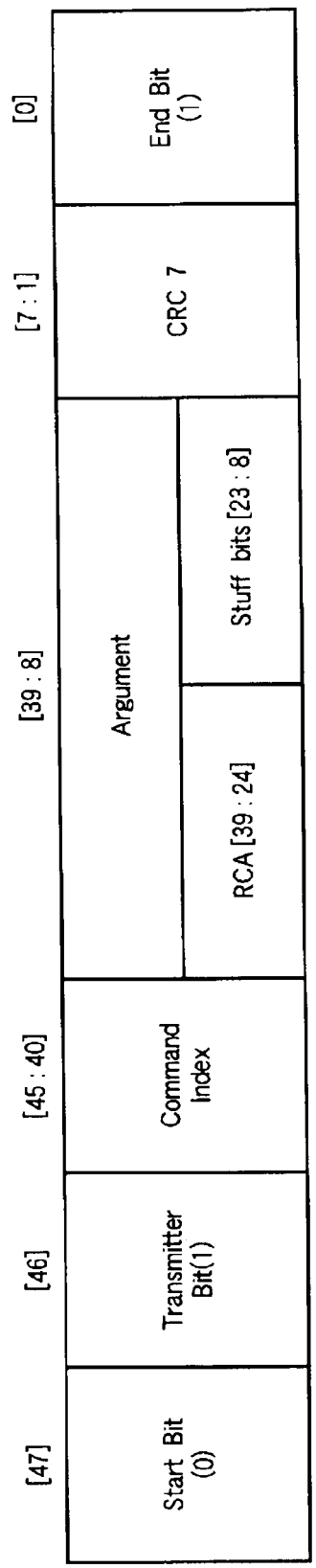
FIG. 11 is a diagram illustrating an example of formats for commands employed in the system shown in FIG. 3.

The RCA is included as an argument in the commands 7, 9, 10, and 13. The command 7 is transmitted to select a SD card to which the host device reads/writes. The commands 9 is transmitted to read a Card Specific Data (CSD) register when the host device does not select a SD card. The commands 10 is transmitted to read a Card IDentification (CID) register when the host device does not select a SD card. The command 13 (confirmation of state) is transmitted to read a status register regardless of selection of a SD card by the host device. As shown in FIG. 11, these commands may have 48 bit length. The host device generates the commands including RCA field in which an intended RCA of the SD card is written. The kind of the command may be identified by checking a command index in a Command Index field.

After transition to Data Transfer Mode, the SD card transits to Stand-By state. The SD card keeps the Stand-By state until a card is selected (the SD card receives the command 7 including a valid RCA). After selection of the card, the SD card transits to Transfer state. While the SD card is in the Transfer state, if the SD card receives a command, the SD card transmits to a Receive-Data state from the Transfer state and performs writing/reading according to the command.

In the system shown in FIG. 3, we consider how the host device 300-2 obtains the RCA of the memory card 200-1 when the host device 300-2 accesses to the memory card 200-1. In Data Transfer Mode, the host device 300-2 needs to transmit a command including a valid RCA (of the memory card 200-1). If the host device 300-2 is a general information processing device, the host device 300-2 may be better to obtain the RCA by initializing the memory card 200-1. However, the host device 300-2 may not have knowledge of timing to generate a command for initialization of the memory card 200-1 (e.g., command 3). Rather, if the host device 300-2 adopts an existing interface, it may be difficult for the host device 300-2 to access to the memory card 200-1.

The interface control device 100 according to the eighth embodiment performs receiving process of a command to initialize the memory card connected to the external device from the host device 300 after the communication through the radio interface 103 has been established.

In the system shown in FIG. 3, after the memory card 200-2 is inserted into a card slot, the host device 300-2 initializes a memory card 200-2. The memory card 200-2 obtains RCA by the initialization and transits to Data Transfer Mode. If the radio communication has been established between the radio interface 103-1 and the radio interface 103-2, the radio state management unit 180-2 indicates that the radio communication has been established to the signal analyzing unit 112-2.

Then, the signal analyzing unit 112-2 checks whether communication between the host device 300-2 and the memory controller 202-2 is being performed or not. If the memory control device 202-2 has not transmitted a response corresponding to a command which had transmitted by the host device 300-2 to the host device 300-2, the signal analyzing unit 112-2 determines that the communication is being performed. On the other hand, if the memory control device 202-2 has already transmitted the response, the signal analyzing unit 112-2 determines that the communication is not being performed.

The signal analyzing unit 112-2 uncorrectly determines that the communication is being performed, even though the memory control device 202-2 has transmitted other response to the host device 300-2. The other response may mean "OK" for a Read request command from the host device 300-2. Because the memory control device 202-2 further transmits Read data after transmitting the response meaning "OK". If the Read request command is a single read request, after the Read data of single time is transmitted to the host device 300-2, the signal analyzing unit 112-2 determines that the communication is not being performed. Moreover, if the Read request command is a multiple read request (which is several times data of the signal read), after the host device 300-2 transmits an End signal to the memory control device 202-2, the signal analyzing unit 112-2 determines that the communication is not being performed. Similarly, when the host device 300-2 transmits a Write request command, the signal analyzing unit 112-2 also checks whether communication between the host device 300-2 and the memory controller 202-2 is being performed or not.

If the memory control device 202-2 is in Sending-Data state or in Receive-Data state, the signal analyzing unit 112-2 determines that the communication is being performed. If the memory control device 202-2 is in Transfer state or in Stand-By state, the signal analyzing unit 112-2 determines that the communication is not being performed. If the memory control device 202-2 is in Transfer state and the host device 300-2 has transmitted a command, the signal analyzing unit 112-2 determines that the communication is being performed until it replies a response corresponding to the command.

The signal analyzing unit 112-2 may determine whether communication is being performed or not by checking an enable signal which shows a signal line of data transfer is used or disused. The signal line of data transfer is one of the signals included in the host interface 102-2. If the enable signal shows the signal line of data transfer is used, the signal analyzing unit 112-2 may determine the communication is being performed. If the enable signal shows the signal line of data transfer is disused, the signal analyzing unit 112-2 may determine the communication is not being performed.

When the signal analyzing unit 112-2 determines the communication is not being performed, the signal analyzing unit 112-2 works below in order to receive a command to initialize the memory card 200-1 from the host device 300-2.

The signal analyzing unit 112-2 analyzes the kind of a command which is received from the host device 300-2. Specifically, the signal analyzing unit 112-2 analyzes which command is received, an initialization command, a state confirmation command, or a transmission command. If the command is the state confirmation command or the transmission command, the signal analyzing unit 112-2 discards the command.

When the host device 300-2 has not received a response corresponding to the transmission command transmitted by itself, the host device 300-2 transmits the state confirmation command. If the host device 300-2 has also not received a response corresponding to the state confirmation command, the host device 300-2 transmits the initialization command because the memory card 200-2 may be in a trouble. When the host device 300-2 receives the initialization command, the signal analyzing unit 112-2 transmits the initialization command to the memory card 200-1 through the radio interface 103-2. The memory card 200-1 is initialized again by the initialization command.

After initialization of the memory card 200-1, the interface controller 110-2 receives a command from the host device 300-2 and transmits the command to the memory card 200-1 through the radio interface 103-2. Also, the interface controller 110-2 receives a response through the radio interface 103-2 and transmits it to the host device 300-2.

The interface control device 100 according to the eighth embodiment performs receiving process of the initialization command for the memory card 200 from the host device 300 again, when the radio communication through the radio interface 103 has been unconnected.

If the radio communication is unconnected between the radio interface 103-1 and the radio interface 103-2 in the system shown in FIG. 3, the radio state management unit 180-2 in the interface controller 110-2 indicates to the signal analyzing unit 112-2 that the radio communication has been unconnected.

If the signal analyzing unit 112-2 is indicated that the radio communication has been unconnected, the signal analyzing unit 112-2 checks whether radio communication between the host device 300-2 and the memory controller 202-1 is being performed or not. The signal analyzing unit 112-2 may execute a same process as checking whether radio communication between the host device 300-2 and the memory controller 202-2 is being performed or not, described above.

When the signal analyzing unit 112-2 determines the communication is not being performed, the signal analyzing unit 112-2 works below in order to receive a command to initialize the memory card 200-2 from the host device 300-2. The signal analyzing unit 112-2 may skip checking whether radio communication is being performed or not, because the radio communication has already been unconnected.

The signal analyzing unit 112-2 analyzes the kind of a command which is received from the host device 300-2. Specifically, the signal analyzing unit 112-2 analyzes which command is received, an initialization command, a state confirmation command, or a transmission command. If the command is the state confirmation command or the transmission command, the signal analyzing unit 112-2 discards the command. The host device 300-2 transmits the initialization command, when the host device 300-2 has not received a response corresponding to the transmission command transmitted by itself for a long time. When the signal analyzing unit 112-2 receives the initialization command, the signal analyzing unit 112-2 transmits the initialization command to the memory controller 202-2 through the memory-control interface 101-2. The memory card 200-2 is initialized again by the initialization command.

After initialization of the memory card 200-2, the interface controller 110-2 receives a command from the host device 300-2 and transmits the command to the memory card 202-2 through the memory-control interface 101-2. Also, the interface controller 110-2 receives a response through the memory-control interface 101-2 and transmits it to the host device 300-2.

The operation of the signal analyzing unit 112-2 may be modified below. In the operation described above, the signal analyzing unit 112-2 discards the state confirmation command or the transmission command from the host device 300-2. Therefore, the host device 300-2 waits to transmit the state confirmation command for a certain time since it transmitted the transmission command. In order to shorten the waiting time, it may be better that the signal analyzing unit 112-2 replies a response, which shows the signal analyzing unit 112-2 is in error condition, to the host device 300-2. If the host device 300-2 receives the response showing error, the host device 300-2 may immediately transmit the state confirmation command. Therefore, the signal analyzing unit 112-2 can receives the state confirmation command earlier by replying the response showing error. This operation which the signal analyzing unit 112-2 replies the response showing error can be performed in both cases when the radio communication has been established and has been unconnected.

Figure 14:
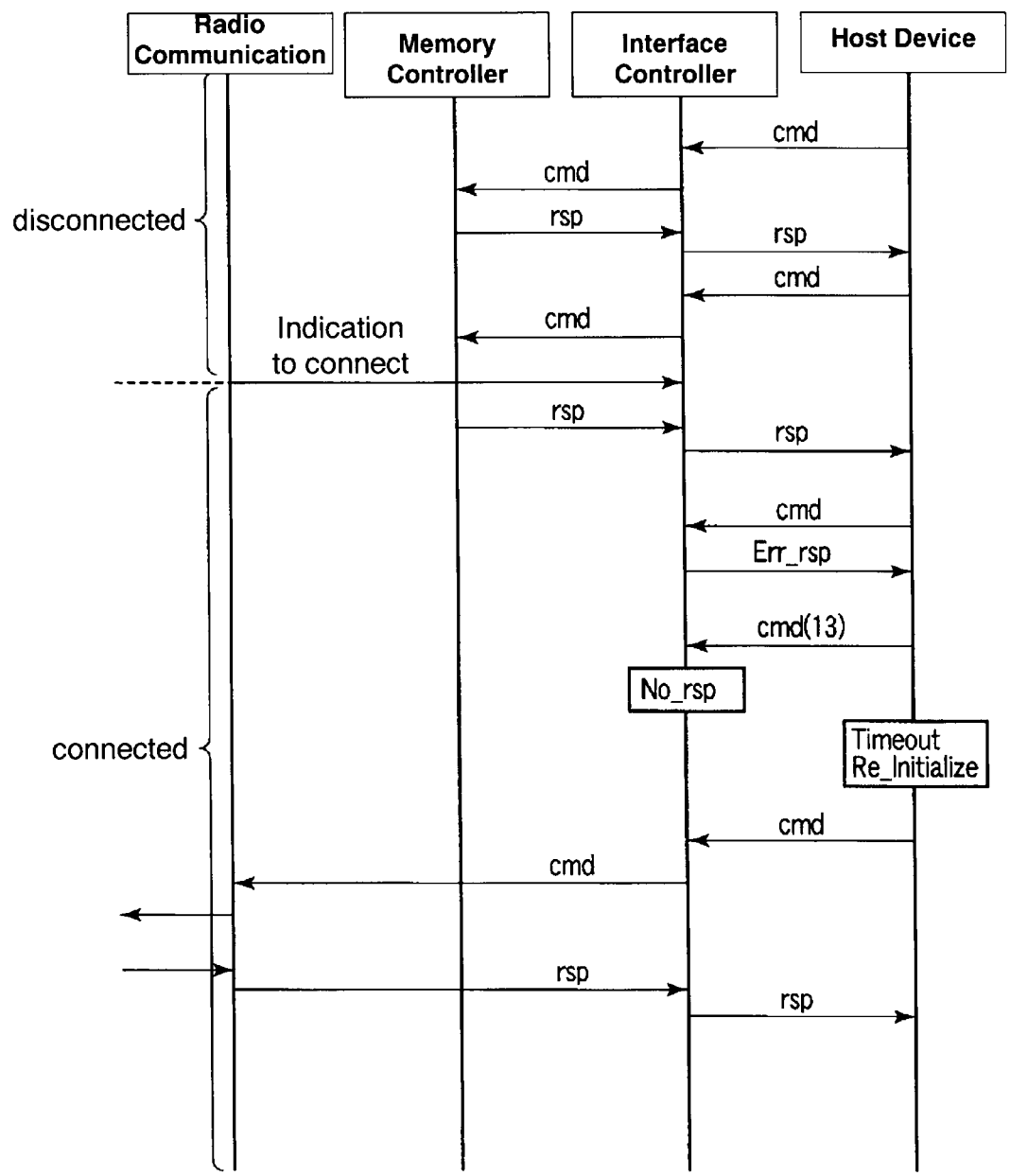
FIG. 14 is a sequence chart explaining an example of initialization in the system shown in FIG. 3.

As shown in FIG. 14, the interface control device 100 relays signals between the host device 300 and the memory controller 202 while the radio communication has been unconnected. When the radio communication is established, the interface control device 100 replies the response showing error and corresponding to a command transmitted by the host device 300. The host device 300 transmits the state confirmation command 13 to the interface control device 100. The interface control device 100 discards the state confirmation command 13. When the waiting time reaches timeout, the host device 300 transmits the initialization command to the interface control device 100 in order to initialize again. The interface control device 100 transmits the initialization command to the external data-storage medium through the radio communication instead of to the memory controller 202. As a result, the external device is initialized. After that, the interface control device 100 relays signals between the host device 300 and the external data-storage medium.

Figure 15:
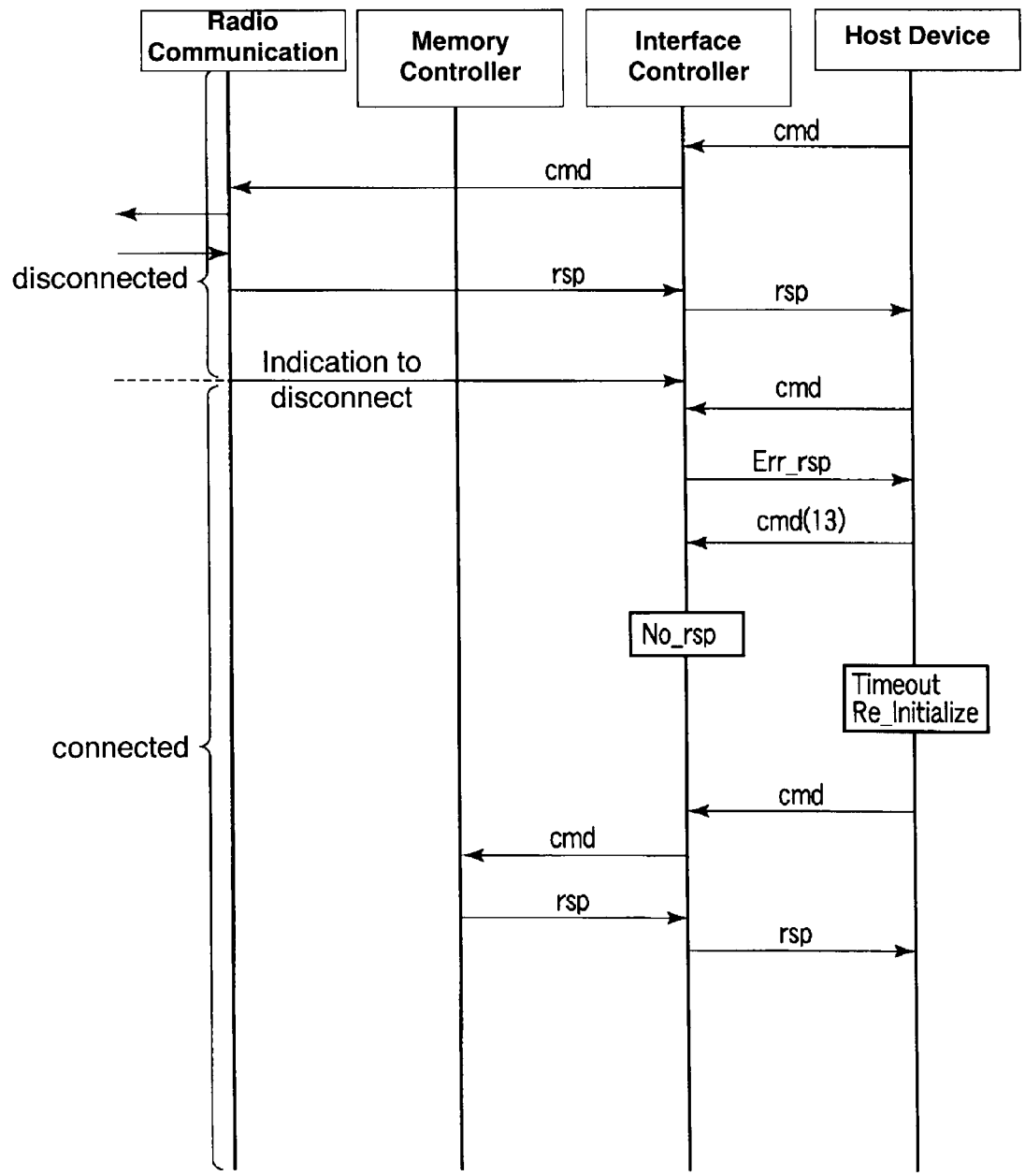
FIG. 15 is a sequence chart explaining another example of initialization in the system shown in FIG. 3.

As shown in FIG. 15, the interface control device 100 relays signals between the host device 300 and the memory controller 202 while the radio communication has been connected. When the radio communication is unconnected, the interface control device 100 replies the response showing error and corresponding to a command transmitted by the host device 300. The host device 300 transmits the state confirmation command 13 to the interface control device 100. The interface control device 100 discards the state confirmation command 13. When the waiting time reaches timeout, the host device 300 transmits the initialization command to the interface control device 100 in order to initialize again. The interface control device 100 transmits the initialization command to the memory controller 202 instead of to the external data-storage medium. As a result, the memory controller 202 is initialized. After that, the interface control device 100 relays signals between the host device 300 and the memory controller 202.

If the memory card 200 is the SD card, different clock frequencies are supplied to the memory controller 202 through the memory-control interface 101 in Identification Mode and in Data Transfer Mode, respectively. The clock frequency in Identification Mode is lower than that in Data Transfer Mode. However, the host device 300-1 has no knowledge that the memory card 200-1 is initialized, when the host device 300-2 tries to initialize the memory card 200-1. Therefore, the host device 300-1 supplies the high clock frequency to the memory card 200-1 according to Data Transfer Mode. As a result, it is better that the interface controller 110-1 supplies the low clock frequency for initialization through the memory-control interface 101-1 by using a method to control the clock frequency as described above.

According to the eighth embodiment, the interface control device discards the command from the host device or the external device and replies the response showing error according to the state of the radio communication. Therefore, the interface control device makes the data-storage medium is initialized by the host device or the external device. As a result, the interface control device can achieve higher efficiency in access from the host device or the external device to the data-storage medium.

Description of the Ninth Embodiment

Figure 12:
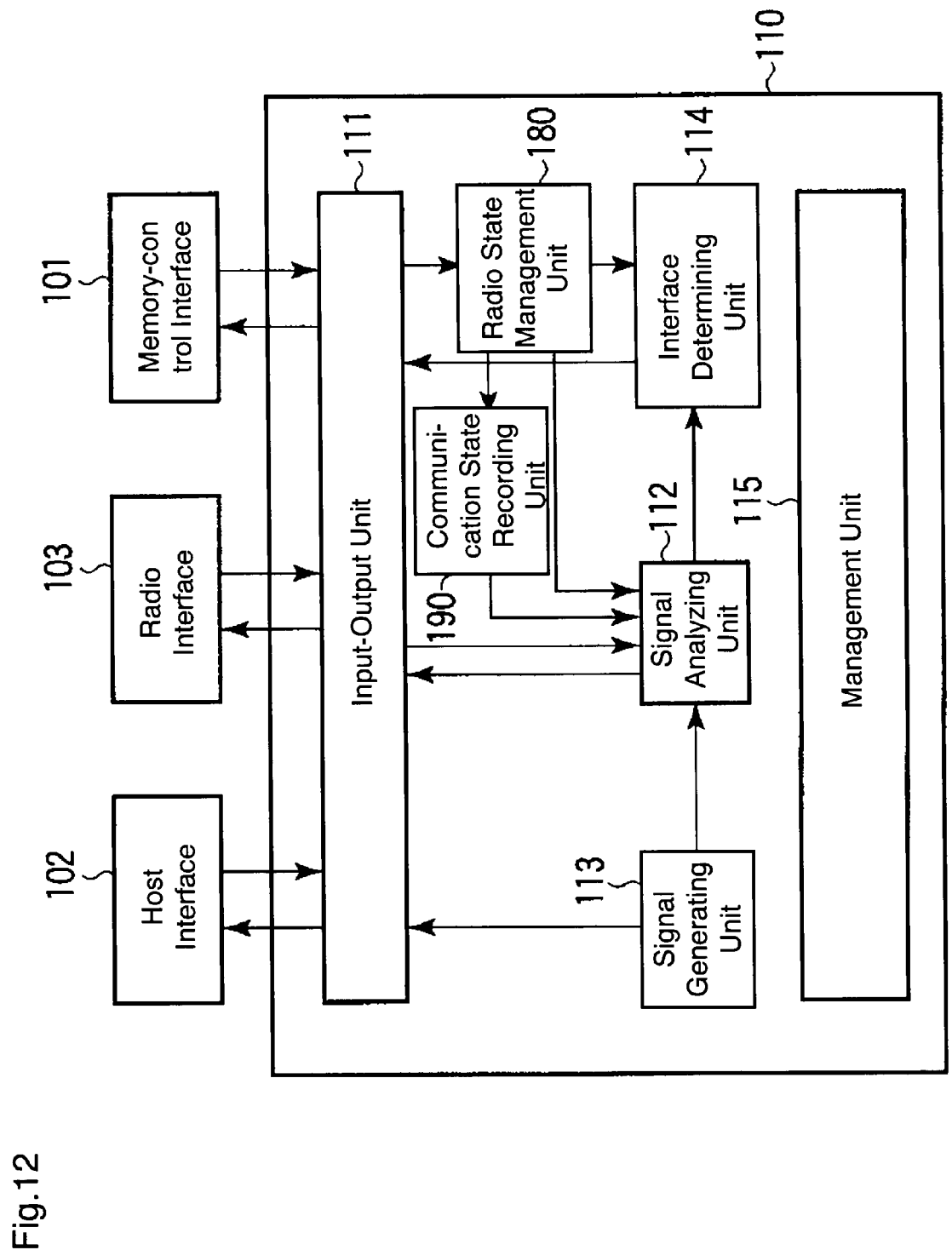
FIG. 12 is a block diagram illustrating an interface control device according to a ninth embodiment.

As shown in FIG. 12, an interface control device 100 in the ninth embodiment is almost same as the interface control device 100 of the eighth embodiment shown in FIG. 10 except for further including a communication state recording unit 190 (a recording unit). We will mainly explain different points between the eighth and ninth embodiments.

The interface control device 100 is supplied power through some of the signal lines included in the host interface 102. The power is supplied to the interface controller 110, the memory-control interface 101, the memory controller 202, and the radio interface 103. When the host device 300 detects that the memory card 200 in inserted into the card slot, the host device 300 starts to supply the power.

A SD card has a function of power reset. When the SD card is in error condition and it is not recovered by the re-initialization, the power reset is performed. Specifically, the host device stops and restarts supplying the power in order to re-initialize. A part of the host device 300 which supports the power reset may perform the power reset when it has not received a response correspond to a command transmitted by itself or when it has received the response showing error. Therefore, in the interface control device 100 of the eighth embodiment, the power reset may be caused by discarding the command or transmitting the response showing error by the interface controller 110.

The power stops being supplied to the radio interface 103 by the power reset. Even though the radio communication has been established, the radio communication will be disconnected. Therefore, the radio interface 103 needs to perform searching and re-connecting after the power restarts being supplied. The interface controller 110 does not detect that the radio communication has been established until the searching and re-connecting are completed. Even though the host device 300 transmits the initialization command before completing the searching and re-connecting, the initialization command is transmitted through the memory-control interface 101 instead of the radio interface 103. As a result, the memory controller 202 is initialized. In order to avoid this problem, the interface control device 100 according to the ninth embodiment further includes a recording communication state unit 190.

The communication state recording unit 190 is provided by non-volatile memory. The radio state management unit 180 records state of the radio communication through the radio interface 103 to the communication state recording unit 190 every transition of the state. Especially, the radio state management unit 180 records the state at a time when the power reset is performed. Even though the power stops being supplied to the interface control device 100 by any reasons including the power reset, the communication state recording unit 190 keeps the state at a time when the power stops being supplied. The communication state recording unit 190 may be a dedicated data-storage medium included in the interface controller 110. Or, the communication state recording unit 190 may be provided by being assigned a part of the flash memory 201. A form to record the state is not defined in the communication state recording unit 190. The form may be 1 bit (state bit) showing connect/disconnect of the radio communication. In this case, the radio state management unit 180 writes "1" in the communication state recording unit 190 when the radio communication is established. On the other hand, the radio state management unit 180 writes "0" in the communication state recording unit 190 when the radio communication is disconnected.

When the power starts being supplied, the signal analyzing unit 112 refers to the communication state recording unit 190. If the radio communication is disconnected at the last time when the power stops being supplied, the host device 300 transmits the initialization command to the memory controller 202 through the memory-control interface 101.

On the other hand, if the radio communication is connected at the last time when the power stops being supplied, the initialization command transmitted by the host device 300 may be given to the external data-storage medium. Therefore, the interface controller 110 keeps the initialization command for a certain time. If the radio communication through the radio interface 103 is established before passing the certain time, the interface controller 110 transmits the initialization command to the external data-storage medium through the radio interface 103. On the other hand, if the radio communication through the radio interface 103 has not been established until passing the certain time, the interface controller 110 transmits the initialization command to the memory controller 202 through the memory-control interface 101. The radio state management unit 180 updates the state to disconnected state in the communication state recording unit 190.

According to the ninth embodiment, when the power starts being supplied, the interface control device switches the interface to which the initialization command from the host device is output according to the state when the power stops being supplied last. Therefore, the interface control device can initialize the data-storage medium rapidly, when the power reset is executed accidentally.

Description of the Tenth Embodiment

An interface control device 100 in the tenth embodiment improves efficiency of supplying the power to the radio interface 103. The interface control device 100 keeps stopping supplying the power to the radio interface 103. Only when a user operates the host device 300, the interface control device 100 supplies the power to the radio interface 103 according to the user's operation.

In the case that the host device 300 is a digital camera, the user may switch a operation mode to a transmission mode in order to transfer a picture file to the external device. The user may switch the operation mode by operating a switch in a package of the digital camera, or by operating through an application. The host device 300 may be a PC, a digital TV, and an information processing device including a card slot such as a mobile phone.

The host device 300 transmits a select command in order to select a memory card which is inserted into the card slot, when the operation mode is switched to the transmission mode by the user. In the case that the memory card 200 is a SD card, the host device 300 transmits a command 7 including RCA of the SD card.

The interface controller 110 receives the select command, and then the interface controller 110 starts supplying the power to the radio interface 103. Then, the interface controller 110 keeps checking whether the radio communication through the radio interface 103 is established or not during a certain period. If the radio communication through the radio interface 103 has been established, the interface controller 110 relays signals between the external data-storage medium and the host device 300 through the radio interface 103. On the other hand, if the radio communication through the radio interface 103 has not been established, the interface controller 110 stops supplying the power to the radio interface 103. In the case of that the host device 300 is a digital camera, the interface controller 110 may need to check whether the radio communication is established or not, because the select command is transmitted to the memory card 200 even though the user just takes a picture. In the case of that the radio communication through the radio interface 103 is a near field communication, it may take a long time to move the host device closer to the external device. Therefore, it is better to have enough time to check whether the radio communication is established or not.

If the RCA in the select command is not either to the memory controller 202 and the external data-storage medium, the interface controller 110 stops supplying the power to the radio interface 103.

According to the tenth embodiment, the interface control device stops supplying the power to the radio interface 103 until receiving the select command generated by the host device due to the user's operation. Therefore, the interface control device can reduce the power supplied by the host device. As a result, the interface control device can make the host device operates for long time.

Description of the Eleventh Embodiment

An interface control device 100 in the eleventh embodiment can reduce a power consumption of the signal analyzing unit 112. As shown in FIG. 13, the interface control device 100 includes the switching unit 105.

In the eighth and ninth embodiments described above, after the radio communication is established, the signal analyzing unit 112 in the interface controller 110 checks whether the communication is performed or not between the host device 300 and the memory controller 202. However, this chick can be skipped by setting the interface controller 110 to be in the second operation mode by the switching unit 105.

In the second operation mode, the host device 300 does not access to the memory controller 202 in order to receive a response showing that the memory capacity is zero. It is sure that the communication between the host device 300 and the memory controller 202 at a time when the radio communication is established. Therefore, the chick can be skipped.

Moreover, in order to skip the check, when the interface controller 110 is set to the second operation mode, writing to the flash memory 201 through the radio interface 103 may be permitted and writing to the flash memory 201 from the host device 300 may be prohibited.

According to the eleventh embodiment, the interface control device 100 prohibits the communication through the memory-control interface 101 and only permits writing to the data-storage medium through the radio interface by setting the interface control device to the second operation mode by the switching unit 105. Therefore, the interface control device 100 can perform the re-initialization more rapidly with reducing the processing load of the signal analyzing unit 112.

Description of the Twelfth Embodiment

An interface control device 100 in the twelfth embodiment can improve efficiency of the radio communication. In general, overhead (for example, preamble) in a packet increases with increasing the transmission rate of the radio communication. Therefore, the efficiency of the radio communication may degrade more with increasing the transmission rate. We can say that the improvement of throughput is smaller compared with the improvement of the transmission rate. One technique to improve the efficiency of the radio communication is an aggregation method. In the aggregation method, plural of packets are transmitted with packetizing in an aggregation packet. The plural of packets are stored in a buffer memory to forms the aggregation packet. However, the buffer memory has large power consumption and large circuit size. Especially, if the buffer memory is a volatile memory, the power consumption is larger.

The interface control device 100 in the twelfth embodiment use a part of the flash memory 201 as the buffer memory. The interface controller 110 checks an available capacity of the flash memory when the interface controller 110 receives a signal (for example, "Write data") from the host device 300 through the host interface 102. If the flash memory 201 has enough available capacity, the interface controller 110 transmits the signals to the memory controller 202 through the memory-control interface 101. Then, when a certain amount or all of signals is stored in the flash memory 201, the interface controller 110 reads the signals through the memory-control interface 101 and transmits them to the radio interface 103. The radio interface 103 generates the aggregation packet according to a signal from the interface controller 110 and transmits it. Since the host device 300 is prohibited to access to the memory card 200 in the second operation mode, enough available capacity may exist in the flash memory 201. Therefore, the interface controller 110 can use the flash memory 201 as the buffer memory in the second operation mode.

Quality of the radio communication through the radio interface 103 sometimes degrades. Specifically, the transmission rate of the radio communication through the radio interface 103 become lower than the transfer rate through the host interface 102. It is useful to use the flash memory 201 as the buffer memory in order to make sure to transmit signals (for example, "Write data"), which is received through the host interface 102, to the external data-storage medium.

Especially, it is more useful when the power supplied by the host device is small. In this case, the clock frequency is small to be supplied to the radio interface 103 and the transmission rate of the radio communication becomes low. Moreover, it also is useful to control flows between the host device 300 and the interface control device 100. However, it may be difficult to realize because the interface of the host device 300 needs to support performing controlling flows.

According to the twelfth embodiment, the interface control device 100 uses the data-storage medium connected to the host device as the buffer memory. Therefore, the interface control device 100 can make the host device accesses to the external data-storage medium with more efficiency.

Description of the Thirteenth Embodiment

An interface control device 100 in the thirteenth embodiment can improve efficiency of transmission of signals of when the host device 300 operates as a receiver and receives signals from the external data-storage medium.

The transfer rate of the communication through the host interface 102 depends on the clock frequency supplied by the host device 300. When the transmission rate of the radio communication through the radio interface 103 is high, a problem is caused. In this case, amount of signals (for example, "Read data") which are received by the interface controller 110 through the radio interface 103 is more than amount of signals which are transmitted through the host interface 102. Therefore, the interface controller 110 needs to discard signals which are not transmitted through the host interface 102 or store the signals in a buffer memory.

In the thirteenth embodiment, the interface controller 110 uses a part of the flash memory 201 as the buffer memory. When the interface controller 110 receives signals through the radio interface 103, the interface controller 110 transmits the signals through the memory-control interface 101 before through the host interface 102. For example, the clock supplying unit 120 may supply a clock with high frequency to the memory-control interface 101. The access rate through the memory-control interface 101 adapts to the transmission rate of the radio communication through the radio interface 103. Therefore, the signals received through the radio interface 103 are transmitted through the memory-control interface 101 and temporarily stored in the flash memory 201.

When the interface controller 110 reads signals from the flash memory 201, the interface controller 110 supplies the clock supplied by the host device 300 to the memory-control interface 101 regardless of the radio communication through the radio interface 103. The signals are transmitted to the host device 300 through the memory-control interface 101 and the host interface 102 with using a transmission rate due to the clock frequency supplied by the host device 300. If the clock frequency supplied by the host device 300 is low, the clock to be supplied to the radio interface 103 may become lower. However, since the performance becomes more unstable with increasing time to transmit the signals in the radio communication, the time in the radio communication is better to be shorter as the thirteenth embodiment.

On the other hand, if the clock frequency supplied by the host device 300 is high, the effect by using the flash memory 201 as the bugger memory may be small. Therefore, the interface controller 110 may transmit the signals from the radio interface 103 only through the host interface 102, when the clock frequency supplied by the host device 300 is higher than the clock frequency to be supplied to the memory-control interface 101 using the clock supplying unit 120.

According to the thirteenth embodiment, the interface control device uses the data-storage medium connected to the host device as the buffer memory, when the clock frequency supplied by the host device is low. Therefore, the interface control device can receive signals from the external data-storage medium with high efficiency regardless of ability of the host device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An interface control device comprising:
   a first interface to communicate with a first information processing device and obtain a first clock signal from the first information processing device;
   a second interface to communicate using a second clock signal with a second information processing device different from the first information processing device;
   a third interface to communicate with a controller of a data-storage medium;
   an interface controller to perform an interface control for the first, second and third interfaces; and
   a clock supplying unit to supply the first clock signal to the third interface while communications through the second interface have not been established.

2. The interface control device of claim 1, wherein the clock supplying unit generates a third clock signal based on the second clock signal and supplies the third clock signal to the third interface, while communications through the second interface have been established.

3. The interface control device of claim 2, wherein the clock supplying unit determines a frequency of the third clock signal based on a transmission rate of communication through the second interface.

4. The interface control device of claim 1, further comprising:
   a switching unit to switch operation modes of the interface controller, the operation modes including
   a first operation mode to transmit a response indicating that the memory capacity is not zero in response to a command requesting a memory capacity of the data-storage medium from the first information processing device
   and a second operation mode to transmit a response indicating that the memory capacity is zero in response to the command requesting a memory capacity of the data-storage medium from the first information processing device.

5. The interface control device of claim 4, wherein the interface controller receives signals through the first interface and transmits the signals through the second interface, while the operation mode is the second operation mode and communications through the second interface have been established.

6. The interface control device of claim 4, further comprising:
   a signal detector to detect a power of a radio signal that the second interface is capable to receive,
   wherein the interface controller keeps the second interface inactive when the first operation mode starts, and the interface controller activates the second interface when the signal detector detects the power of the radio signal for the first time.

7. The interface control device of claim 1, wherein the interface controller receives signals through the third interface and transmits the signals through the second interface, while communications through the second interface have been established.

8. The interface control device of claim 1, wherein the interface controller obtains a power through the first interface.

9. The interface control device of claim 8, wherein the interface controller determines at least one of a maximum transmission rate through the second interface, a maximum transmission power of the second interface, and a frequency of the second clock according to supplied amount of the power.

10. The interface control device of claim 1, further comprising:
    a recording unit to store a state of communication through the second interface at the last time when a power stops being supplied to the interface controller, the state showing whether the communication through the second interface is established or not,
    wherein the interface controller determines whether a signal is transmitted through the second interface or the third interface according to the state of communication,
    the signal being first received to initialize the data-storage medium through the first interface after the power starts to supplied,
    if the state in the recording unit shows the communication is established.

11. The interface control device of claim 1, wherein the interface controller starts to supply a power to the second interface after a signal showing the selected data-storage medium is received through the first interface.

12. The interface control device of claim 1, wherein the interface controller stops supplying the power to the second interface
    when the communication through the second interface has not been established after the interface controller starts supplying a power to the second interface,
    or when a signal showing a second data-storage medium is received through the first interface, the second data-storage medium is neither the data-storage medium nor an external data-storage medium connected through the second interface.

13. The interface control device of claim 1, wherein the interface controller receives signals through the second interface
    and temporarily stores the signals in the data-storage medium through the third interface and transmits the signals through the first interface.

14. The interface control device of claim 2, wherein the interface controller temporarily receives signals through the second interface
    and stores the signals in the data-storage medium through the third interface and transmits the signals through the first interface,
    if the first clock signal is slower than the third clock signal.

15. The interface control device of claim 14, wherein the clock supplying unit supplies the first clock signal to the third interface
    while the interface controller transmits the signals stored in the data-storage medium trough the first interface.

16. An interface control device comprising:
    a first interface to communicate with a first information processing device and obtain a first clock signal;
    a second interface to communicate using a second clock signal with a second information processing device different from the first information processing device;
    a third interface to communicate with a controller of a data-storage medium;
    a converting unit to converts a frequency of the first clock signal to a frequency of the second clock signal;
    an interface controller to perform an interface control for the first, second and third interfaces; and
    a clock supplying unit to supply the first clock signal to the third interface while communications through the second interface have not been established
    and to generate a third clock signal based on the second clock signal and supply the third clock signal to the third interface while communications through the second interface have been established.

17. An interface control device comprising:
a first interface to communicate with a first information processing device;
a second interface to communicate with a second information processing device different from the first information processing device;
a third interface to communicate with a controller of a data-storage medium;
a management unit to manage a state of communications through the second interface; and
an interface controller to perform an interface control including
a determination whether signals are transmitted through either the second or third interface, or, neither the second nor third interface,
according to a kind of the signals and the state of the communications, the signals being received through the first interface.

18. The interface control device of claim 17, wherein the interface controller determines that
if the kind of the signal is a first signal to check a state of the data-storage medium, the first signal is transmitted to neither the second interface nor the third interface,
and if the kind of the signal is a second signal to initialize the data-storage medium, the second signal is transmitted through the second interface,
while the state of the communications shows that the communication has been established.

19. The interface control device of claim 18, wherein the interface controller determines that
if the kind of the signal is a third signal to transmit data in Data Transfer Mode of the controller of the data-storage medium, a signal showing error of the data-storage is transmitted through the first interface.

20. The interface control device of claim 17, wherein the interface controller determines that
if the kind of the signal is a first signal to check a state of the data-storage medium, the first signal is transmitted to neither the second interface nor the third interface,
and if the kind of the signal is a second signal to initialize the data-storage medium, the second signal is transmitted through the third interface,
while the state of the communications shows that the communication has been disconnected.

\* \* \* \* \*